United States Patent
Nagvekar et al.

(10) Patent No.: US 7,893,127 B2
(45) Date of Patent: Feb. 22, 2011

(54) RADIATION CURABLE AND JETTABLE INK COMPOSITIONS

(75) Inventors: Devdatt S. Nagvekar, Hamilton, OH (US); Matthew M. Ellison, Mason, OH (US)

(73) Assignee: Collins Ink Corporation, Cincinnati, OH (US)

( * ) Notice: Subject to any disclaimer, the term of this patent is extended or adjusted under 35 U.S.C. 154(b) by 49 days.

(21) Appl. No.: 11/973,934

(22) Filed: Oct. 11, 2007

(65) Prior Publication Data

US 2008/0090931 A1 Apr. 17, 2008

Related U.S. Application Data

(60) Provisional application No. 60/851,023, filed on Oct. 11, 2006.

(51) Int. Cl.
*C08F 2/46* (2006.01)
(52) U.S. Cl. .......... 522/120; 522/74; 522/113; 522/114; 522/121; 522/90; 522/96; 522/178; 522/173; 523/160; 523/161; 106/31.13; 106/31.6
(58) Field of Classification Search .......... 522/74, 522/114, 174, 90, 96, 178, 173, 113, 120, 522/121, 116, 909; 523/160, 161; 106/31.13, 106/31.6
See application file for complete search history.

(56) References Cited

U.S. PATENT DOCUMENTS

| 4,358,476 | A | 11/1982 | Zimmer et al. |
| 6,593,390 | B1 | 7/2003 | Johnson et al. |
| 2002/0086914 | A1* | 7/2002 | Lee et al. ................ 522/75 |
| 2002/0128351 | A1* | 9/2002 | Kiguchi et al. ........... 523/161 |
| 2003/0158283 | A1 | 8/2003 | Ylitalo et al. |
| 2006/0054040 | A1* | 3/2006 | Daems et al. ........... 101/463.1 |
| 2006/0158496 | A1* | 7/2006 | Odell et al. ............. 347/100 |
| 2006/0222831 | A1 | 10/2006 | Sloan |
| 2006/0275588 | A1 | 12/2006 | Sloan |
| 2008/0090930 | A1* | 4/2008 | Madhusoodhanan et al. .. 522/83 |

FOREIGN PATENT DOCUMENTS

WO    WO 2006/085992 A2    8/2006

* cited by examiner

*Primary Examiner*—Sanza L McClendon
(74) *Attorney, Agent, or Firm*—Charles R. Wilson

(57) ABSTRACT

Radiation curable and jettable ink compositions comprise ethylenically unsaturated oligomer and an ethylenically unsaturated monofunctional monomer. The compositions may optionally include additional ethylenically unsaturated polyfunctional component and/or chain transfer agent. The compositions have a viscosity at 25° C. of not greater than about 70 cPs and are radiation curable to form a cured ink having an elongation of at least 150%.

22 Claims, No Drawings

RADIATION CURABLE AND JETTABLE INK COMPOSITIONS

RELATED APPLICATION DATA

This application claims the benefit of U.S. Provisional Application Ser. No. 60/851,023 filed Oct. 11, 2006, the entire contents of which are hereby incorporated by reference.

FIELD OF THE INVENTION

The present invention is directed to radiation curable and jettable ink compositions and particularly to such compositions which exhibit high elongation and are advantageous, for example, for use in digital ink jet printing for formable applications.

BACKGROUND OF THE INVENTION

Various radiation curable, and particularly ultraviolet (UV) light curable, ink compositions are known in the art. By nature, UV curable inks are primarily thermoset systems. The thermoset nature of these materials makes it difficult to formulate inks that exhibit high elongation upon curing and formability, i.e. by thermoforming, vacuum forming, or the like. This difficulty can be alleviated to a degree by using high molecular weight oligomers which can improve the elongation and formability of UV cured materials. However, the addition of high molecular weight oligomers increases the viscosity of the liquid materials which prohibits their use in jettable applications in where viscosities are typically below 70 cPs at 25° C. While solvent-based, air cured jettable inks have been proposed, where the viscosity of the polymer or oligomer is reduced with a solvent, such inks require unpractical drying times and can be unfriendly to the environment due to high volatile organic component content.

UV curable screen inks have been used, however, screen ink processes require building a new screen each time the printed image changes. An operator does not have the ability to change the image on demand, as is the case with a digital inkjet printing process.

Other considerations are also important in formulating inks to satisfy numerous criteria affecting ink performance and stability. For example, the inks must possess an appropriate level of surface tension, low volatility, low smear, high image quality (especially at high print speeds), and adhesion to a variety of substrate materials. Stability of the inks is also important, including storage stability, stability at high shear rates, stability at high temperatures, and stability at the extreme conditions inside a print head, e.g. a piezoelectric or thermal head. Also desired is the elimination of volatile solvents from the inks. Current commercially available UV curable inkjet inks are limited in one or more of these areas.

US Pub. No. 2006/0222831 discloses curable ink compositions comprising an oligomeric component, which has a molecular weight of more than about 10,000 g/mole and which does not contain radiation curable ethylenically unsaturated functionality, a diluent, additives, and a mono-functional monomer having a molecular weight of 100 g/mol to 600 g/mol. US Pub. No. 2006/0275588 is a Continuation-in-Part of US Pub. No. 2006/0222831, and discloses curable ink compositions additionally comprising an acrylic polymer or copolymer having an acid number of below about 20. The compositions of the present invention differs from these disclosures in that they do not include the described high molecular weight non-reactive oligomer, do not require the presence of a solvent and, by contrast, the oligomer component included in the compositions of the invention, contains radiation curable, ethylenically unsaturated functionality.

Accordingly, a need exists for further improvements in radiation curable and jettable inks.

SUMMARY OF THE INVENTION

The present invention is directed to radiation curable and jettable ink compositions.

In one embodiment, the invention is directed to a radiation curable and jettable ink composition which comprises an oligomer containing an ethylenically unsaturated radiation curable functional group, an ethylenically unsaturated monofunctional monomer, and optionally additional ethylenically unsaturated polyfunctional component and/or chain transfer agent. The composition is substantially free of solvent, has a viscosity at 25° C. of not greater than about 70 cPs, preferably not greater than about 50 cPs and more preferably not greater than 30 cPs, and is radiation curable to form a cured ink having an elongation of at least 150%.

In another embodiment, the invention is directed to a radiation curable and jettable ink composition which comprises an acrylate oligomer containing an ethylenically unsaturated radiation curable functional group, at least 15 wt % of a monofunctional acrylate, a colorant, and optionally an additional ethylenically unsaturated polyfunctional component. The composition is substantially free of solvent, has a viscosity at 25° C. of not greater than about 70 cPs, has a static surface tension at 25° C. of not greater than about 40 dynes/cm, and is radiation curable to form a cured ink having an elongation of at least 150%.

In another embodiment, the invention is directed to a radiation curable and jettable ink composition which comprises an aromatic mono-acrylate oligomer, an additional acrylate oligomer, which may be polyfunctional, a monofunctional acrylate monomer, a colorant, and optionally additional ethylenically unsaturated polyfunctional component and/or chain transfer agent. The amount of the oligomers and any optional additional ethylenically unsaturated polyfunctional component combined, is less than the amount of the monofunctional acrylate monomer and any optional chain transfer agent combined. The composition is substantially free of solvent, has a viscosity at 25° C. of not greater than about 70 cPs, and is radiation curable to form a cured ink having an elongation of at least 150%.

In another embodiment, the ink compositions of the invention are substantially free of non-reactive oligomers and preferably substantially free of non-reactive oligomers having a molecular weight of greater than 10,000 g/mole. In another embodiment, the ink compositions of the invention are free of acrylic polymer or co-polymer having an acid number below about 20.

In another embodiment, the invention is directed to a radiation curable and jettable ink composition which consists essentially of an oligomer containing an ethylenically unsaturated radiation curable functional group, an ethylenically unsaturated monofunctional monomer, a colorant, at least one photoinitiator, and optionally an additional ethylenically unsaturated polyfunctional component or chain transfer agent containing ethylenically unsaturated radiation curable functional groups. The composition has a viscosity at 25° C. of not greater than about 70 cPs and, is radiation curable to form a cured ink having an elongation of at least 150%.

DETAILED DESCRIPTION

The present invention is directed to radiation curable and jettable ink compositions which comprise an ethylenically unsaturated oligomer and an ethylenically unsaturated monofunctional monomer. The compositions optionally include additional ethylenically unsaturated polyfunctional component and/or a chain transfer agent. Within the present description "polyfunctional component" refers to a monomer or oligomer component containing two or more functional groups per molecule.

The ethylenically unsaturated oligomer suitable for use in the radiation curable ink compositions provides a template for a thermoplastic backbone, but is used in a relatively low amount, in order to maintain low viscosity, while also maintaining a low modulus and improved elongation in the resulting cured inks. Exemplary oligomers include ethylenically unsaturated oligomers of the following general classes: urethane, polyether, polyester, polycarbonate, polyestercarbonate, acrylic, silicone, and the like, including and any combination or subset thereof. In specific embodiments, the oligomer comprises a urethane oligomer, an acrylate oligomer, preferably an aromatic mono-acrylate oligomer, a urethane acrylate oligomer, a polyester oligomer, or any combination or subset thereof.

In one embodiment, the oligomer comprises a urethane oligomer comprising urethane repeating units and one, two or more ethylenically unsaturated functional groups, which can include, for example, acrylate, methacrylate, allyl, and/or vinyl groups, preferably acrylate and vinyl ether groups. In a more specific embodiment, aliphatic, cycloaliphatic, or mixed aliphatic and cycloaliphatic urethane repeating units are suitable. Urethanes are typically prepared by the condensation of a diisocyanate with a diol. Aliphatic urethanes having at least two urethane moieties per repeating unit are useful, wherein the diisocyanate and diol used to prepare the urethane comprise divalent aliphatic groups that may be the same or different.

Polyester and polyether urethane oligomers functionalized with ethylenic unsaturation are particularly useful. The ethylenic unsaturation may be provided by functional groups such as acrylate, $C_1$-$C_4$ alkyl(acrylate) (e.g., methacrylate, ethacrylate, etc.), vinyl, allyl, acrylamide, $C_1$-$C_4$ alkyl(acrylamide), and the like groups. The reactive functionality of these urethane acrylates is 1 or greater, specifically about 2 reactive groups per oligomer molecule.

Suitable polyether or polyester ethylenically unsaturated urethane oligomers include the reaction product of an aliphatic or aromatic polyether or polyester polyol with an aliphatic or aromatic polyisocyanate that is functionalized with ethylenic unsaturation using a monomer containing the ethylenic unsaturation. Such oligomers may be prepared using procedures well known in the art. The polyether polyol is based on a straight chained or branched alkylene oxide of from one to about twelve carbon atoms, and may be prepared by any method known in the art.

The aliphatic polyisocyanate component contains about 4 to 20 carbon atoms. Exemplary aliphatic polyisocyanates include isophorone diisocyanate; dicyclohexylmethane-4,4'-diisocyanate; 1,4-tetramethylene diisocyanate; 1,5-pentamethylene diisocyanate; 1,6-hexamethylene diisocyanate; 1,7-heptamethylene diisocyanate; 1,8-octamethylene diisocyanate; 1,9-nonamethylene diisocyanate; 1,10-decamethylene diisocyanate; 2,2,4-trimethyl-1,5-pentamethylene diisocyanate; 2,2'-dimethyl-1,5-pentamethylene diisocyanate; 3-methoxy-1,6-hexamethylene diisocyanate; 3-butoxy-1,6-hexamethylene diisocyanate; omega, omega'-dipropylether diisocyanate; 1,4-cyclohexyl diisocyanate; 1,3-cyclohexyl diisocyanate; trimethylhexamethylene diisocyanate; and combinations comprising at least one of the foregoing. Suitable aromatic polyisocyanates include toluene diisocyanate, methylene bis-phenylisocyanate (diphenylmethane diisocyanate), methylene bis-cyclohexylisocyanate (hydrogenated MDI), naphthalene diisocyanate, and the like.

The oligomer may be provided with the ethylenic unsaturation by use of acrylate or methacrylate monomers. Typically the ethylenically unsaturated monomer contains a hydroxyl-terminus. Such monomers include, for example, hydroxyalkyl acrylates or methacrylates such as hydroxyethyl acrylate, hydroxyethyl methacrylate, hydroxypropyl acrylate, hydroxypropyl methacrylate, hydroxybutyl acrylate, hydroxybutyl methacrylate, and the like.

In one embodiment, the molar ratio of the polyol, diisocyanate, and ethylenic unsaturation monomer can be approximately 1:2:2.

Examples of suitable urethane acrylate oligomers include, but are not limited to, aliphatic polyester based urethane diacrylate oligomers, examples of which are commercially available from Sartomer Company, Inc. ("Sartomer") and include those sold under the designations CN991, CN962, CN964 and CN966.

Examples of suitable acrylate oligomers include low viscosity acrylate oligomers, for example having viscosities lower than about 5000 cPs, more specifically lower than about 2000 cPs. Examples of commercially available low viscosity acrylate oligomers include, but are not limited to, those available from Sartomer under the CN designation, for example, CN-130 (aliphatic monoacrylate oligomer with a viscosity of 40 cPs at 25° C.), CN-131 (aromatic monoacrylate oligomer with a viscosity of 202 cPs at 25° C.), CN-152 (aliphatic monoacrylate oligomer with a viscosity of 130 cPs at 25° C.), CN-3100 (acrylate oligomer with hydroxyl functionality), and CN2285 (acrylate oligomer).

Examples of suitable polyester oligomers include low molecular weight, low viscosity polyester oligomers, one example of which is R-Gen RD-276, commercially available from Chitech Chemical Company, having a molecular weight of about 1000.

In one embodiment, the oligomer has a molecular weight of up to about 50,000 Daltons, specifically about 500 to about 50,000; more specifically about 1000 to about 40,000; and yet more specifically about 1200 to about 30,000 Daltons. In another embodiment, the oligomer has a molecular weight of less than 10,000 Daltons. In one embodiment, the viscosity of the oligomer is from about 500 cPs to about 100,000 cPs at 60° C., specifically about 1000 to about 65,000 cPs, more specifically about 1000 to about 45,000 cPs.

The ink compositions of the invention can suitably contain a mixture of two or more oligomers. In one embodiment, additional oligomer used in combination with an ethylenically unsaturated oligomer as described includes the low viscosity acrylate oligomers described above.

In another embodiment, the ink compositions of the invention are substantially free of non-reactive oligomers and preferably substantially free of non-reactive oligomers having a molecular weight of more than about 10,000 g/mole. Specifically, the ink compositions of the invention are free of oligomers which do not contain ethylenically unsaturated radiation curable functional groups and therefore are non-reactive.

The ethylenically unsaturated monofunctional monomer which is employed in the ink compositions of the invention increases chain length of the oligomers and builds molecular weight, without excessive crosslinking, again contributing to low modulus and high elongation of the cured ink. The ethylenic unsaturation in the ethylenically unsaturated monofunctional monomer may comprise methacrylate, acrylate, vinyl ether, allyl ether, methacrylamide, acrylamide, N-vinyl amide, carbon-carbon double bond, or a combination thereof. In a specific embodiment, the ethylenically unsaturated monofunctional monomer comprises a monofunctional acrylate monomer. In another embodiment, the monofunctional monomer comprises a mixture of two or more monofunctional monomers. In another specific embodiment, the monofunctional monomer comprises a monofunctional acrylate containing a cyclic group, for example a homocyclic group or a heterocyclic group, optionally comprising a fused ring structure. The cyclic group may be aliphatic or aromatic, or the monomer may comprise a combination of such groups. Examples of monofunctional monomers include, but are not limited to, those commercially available from Sartomer under the SR and CD designations, for example, 2(2-ethoxyethoxy) ethyl acrylate (SR 256), tetrahydrofurfuryl acrylate (SR 285), phenoxyethyl acrylate (SR399), alkoxylated nonylphenol acrylate (SR614), isodecyl acrylate (SR 395), 2-phenoxyethyl acrulate (SR 339), isodecyl methacrylate (SR 242), isobornyl acrylate (SR506), trimethylcyclohexane acrylate monomer (CD 420), acrylic esters (CD 277, 278, 585, 586), cyclic trimethylolpropane formal acrylate (SR531), and the like. Others include Laromer TBCH and Laromer DCPA commercially available from BASF Corporation ("BASF") and Genomer 1122 commercially available from Rahn AG ("Rahn"), vinyl caprolactam ("V-Cap"), vinyl pyrrolidone, and Neodene 16 commercially available from Shell Chemical Co. ("Shell"). In one embodiment, the monofunctional monomer has a Tg (glass transition temperature) of at least 25° C. In further embodiments, the monofunctional monomer has a Tg of at least 40° C., more specifically at least 50° C.

The ink compositions may optionally include an additional ethylenically unsaturated polyfunctional component (other than the required oligomer) and/or chain transfer agent. The polyfunctional component may be a monomer, an oligomer, or a combination thereof. In one embodiment, the ethylenically unsaturated polyfunctional component can act as a co-initiator, but without causing excessive crosslinking, and therefore used in relatively low amounts of, for example, from about 1 to about 5 wt %, while in other embodiments, the ethylenically unsaturated polyfunctional component can act as a crosslinker, but without excessively raising the viscosity of the ink compositions, and therefore is again used in relatively low amount of, for example, from about 1 to about 15 wt %. The ethylenic unsaturation in the ethylenically unsaturated polyfunctional component may comprise methacrylate, acrylate, vinyl ether, allyl ether, methacrylamide, carbon-carbon double bond, or a combination thereof. In a specific embodiment, the ethylenically unsaturated polyfunctional component comprises a polyfunctional acrylate, i.e., a diacrylate, triacrylate, or higher, or combinations thereof. Optionally, the polyfunctional component may include a siloxane backbone in order to further improve cure, flexibility and/or additional properties of the ink compositions. The polyfunctional oligomer, if employed, is in addition to, for example, urethane acrylate oligomer as described above, and may comprise acrylated silicone, acrylated amine, acrylated polyester, or acrylated polyethers, or combinations thereof. Examples of polyfunctional components include CN 966J75, and CN 9800, commercially available from Sartomer, and EB 1360 and EB 350, commercially available from Cytec Industries, Inc. ("Cytec"), as demonstrated in the Examples below.

In another embodiment, the ink compositions of the invention are free of acrylic polymer or co-polymer having an acid number of below about 20. By acid number it is meant the weight in milligrams of potassium hydroxide required to neutralize the pendant carboxylate groups in one gram of polymer. The procedure for determining acid numbers is described in ASTM D 974 and D 604.

The chain transfer agent may be employed to contribute to the desired low modulus and high elongation of the ink compositions. In one embodiment, the chain transfer agent may comprise one or more acetoacetates, for example, 2-(acetoacetoxy)ethyl acrylate ("AAEA"), acrylic acid 4-(3-oxo-butryloxy)-butyl ester ("AABUA"), 2-(acetoxyacetoxy)ethyl methacrylate ("AAEMA"), 2-(acetoacetoxy)propyl acrylate/ 2-(acetoacetoxy)isopropyl acrylate mixture ("AAPRA"), thiols, amines or a combination thereof. Suitable thiol containing compounds include but are not limited to isooctylmercaptopropane, 1,2-dimercaptoethane, 1,6-dimercaptohexane, neopentanetetrathiol, and the like, pentaerythritol tetra(3-mercapto propionate), 2,2-bis(mercaptomethyl)-1,3-propanedithiol, and the like, aryl thiol compounds such as 4-ethylbenzene-1,3-dithiol, 1,3-diphenylpropane-2,2-dithiol, 4,5-dimethylbenzene-1,3-dithiol, 1,3,5-benzenetrithiol, glycol dimercaptoacetate, glycol dimercaptopropionate, pentaerythritol tetrathioglycolate, trimethylolpropane trithioglycolate, and the like. In another embodiment, the chain transfer agent comprises a mercapto-functional silicone. More specifically, the chain transfer agent is a silicone containing 2 mole % or greater (mercaptopropyl)methyl siloxane, examples of which include, but are not limited to, SMS-042 from Gelest, Inc. ("Gelest") and GP-367 from Genessee Polymers Co. ("Genessee"). Such materials are particularly suitable in that the silicone component acts like a surfactant and will orient towards the surface of the ink when deposited. The mercapto groups can react with the ethylenically unsaturated groups of the other components through a thiol-ene reaction. This reaction is generally insensitive to oxygen whereas most free radical polymerizations are inhibited by oxygen. Thus, the preferential migration of the silicone to the surface can improve surface cure and eliminate surface tack by creating a thiol rich zone at the surface where oxygen inhibition would be the greatest.

The ink compositions are preferably substantially non-aqueous, substantially free of a solvent, or substantially free of both, that is, a compound having a boiling point at atmospheric pressure of less than about 120° C. As used herein, substantially non-aqueous means that no water is added to the inks other than the incidental amounts of moisture derived from ambient conditions. Non-aqueous inks can therefore have less than about 3 wt. % of water, more specifically less than about 2 wt. % of water, even more specifically less than about 1 wt. % of water, based on the total weight of the ink. Substantially free of solvents means that the ink contains less than about 20 wt. % of solvent. In more specific embodiments, the ink contains less than about 10 wt. % solvent, more specifically, less than about 5 wt. % solvent, yet more specifically less than about 2 wt. % of solvent, and even more specifically less than about 1 wt. % of solvent, based on the total weight of the ink.

The ink compositions may further contain a colorant which may comprise pigment, dye, or a combination of pigments and/or dyes to provide the desired color. Any pigment, dye or combinations of pigments and dyes can be used, provided that the desired thermal stability of the resulting ink is maintained. The ink is not limited to any particular color. Suitable colors include, for example cyan, magenta, yellow, black, white, orange, green, light cyan, light magenta, violet, and the like.

Exemplary pigments include those having the following Color Index classifications: Green PG 7 and 36; Orange PO 5, 34, 36, 38, 43, 51, 60, 62, 64, 66, 67 and 73; Red PR 112, 149, 170, 178, 179, 185, 187, 188, 207, 208, 214, 220, 224, 242, 251, 254, 255, 260 and 264; Magenta/Violet PV 19, 23, 31, and 37, and PR 122, 181 and 202; Yellow PY 17, 120, 138, 139, 155, 151, 168, 175, 179, 180, 181 and 185; Blue PB 15, 15:3, 15:4; Black PB 2, 5 and 7; carbon black; titanium dioxide (including rutile and anatase); zinc sulfide, and the like or a mixture thereof. Other specific pigments include, for example, IRGALITE BLUE GLVO, MONASTRAL BLUE FGX, IRGALITE BLUE GLSM, HELIOGEN BLUE L7101F, LUTETIA CYANINE ENJ, HELIOGEN BLUE L6700F, MONASTRAL GNXC, MONASTRAL GBX, MONASTRAL GLX, MONASTRAL 6Y, IRGAZIN DPP ORANGE RA, NOVAPERM ORANGE H5G70, NOVPERM ORANGE HL, MONOLITE ORANGE 2R, NOVAPERM RED HFG, HOSTAPERM ORANGE HGL, PALIOGEN ORANGE L2640, SICOFAST ORANGE 2953, IRGAZIN ORANGE 3GL, CHROMOPTHAL ORANGE GP, HOSTAPERM ORANGE GR, PV CARMINE HF4C, NOVAPERM RED F3RK 70, MONOLITE RED BR, IRGAZIN DPP RUBINE TR, IRGAZIN DPP SCARLET EK, RT-390-D SCARLET, RT-280-D RED, NOVAPERM RED HF4B, NOVAPERM RED HF3S, NOVAPERM RD HF2B, VYNAMON RED 3BFW, CHROMOPTHAL RED G, VYNAMON SCARLET 3Y, PALIOGEN RED L3585, NOVAPERM RED BL, PALIOGEN RED 3880 HD, HOSTAPERM P2GL, HOSTAPERM RED P3GL, HOSTAPERM RED E5B 02, SICOFAST RED L3550, SUNFAST MAGENTA 122, SUNFAST RED 122, SUNFAST VIOLET 19 228-0594, SUNFAST VIOLET 19 228-1220, CINQUASIA VIOLET RT-791-D, VIOLET R NRT-201-D, RED B NRT-796-D, VIOLET R RT-101-D, MONOLITE VIOLET 31, SUNFAST MAGENTA 22, MAGENTA RT-243-D, MAGENTA RT 355-D, RED B RT-195-D, CINQUASIA CARBERNET RT-385-D, MONOLITE VIOLET R, MICROSOL VIOLET R, CHROMOPTHAL VIOLET B, ORACET PINK RF, IRGALITE YELLOW 2GP, IRGALITE YELLOW WGP, PV FAST YELLOW HG, PV FAST YELLOW H3R, HOSTAPERM YELLOW H6G, PV FAST YELLOW, PALIOTOL YELLOW D1155 and IRGAZIN YELLOW 3R.

A number of different carbon black type pigments are commercially available, for example and carbon blacks such as SPECIAL BLACK 100, SPECIAL BLACK 250, SPECIAL BLACK 350, FW1, FW2 FW200, FW18, SPECIAL BLACK 4, NIPEX 150, NIPEX 160, NIPEX 180, SPECIAL BLACK 5, SPECIAL BLACK 6, PRINTEX 80, PRINTEX 90, PRINTEX 140, PRINTEX 150T, PRINTEX 200, PRINTEX U, and PRINTEX V, all available from Degussa Corporation ("Degussa"), MOGUL L, REGAL 400R, REGAL 330, and MONARCH 900, available from Cabot Chemical Co. ("Cabot"), MA77, MA7, MA8, MA11, MA10, MA100R, MA100S, MA230, MA220, MA200RB, MA14, #2700B, #2650, #2600, #2450B, #2400B, #2350, #2300, #2200B, #1000, #970, #3030B, and #3230B, all available from Mitsubishi Chemical Corporation ("Mitsubishi"), RAVEN 2500 ULTRA, Carbon black 5250, and Carbon Black 5750 from Columbia Chemical Co. ("Columbia"), and the like.

A number of titanium oxide pigments, including nano-structured titania powders, are also known and suitable for use herein. The titanium oxide particles can be coated with an oxide, such as alumina or silica, for example. One, two, or more layers of a metal oxide coating may be used, for example a coating of alumina and a coating of silica, in either order. In the alternative, or in addition, the titanium oxide particles may be surface treated with an organic compatibilization agent such as a zirconate, titanate, silanes, silicones, and the like.

If the colorant includes a pigment, the pigment is suitably pre-dispersed prior to incorporation into the ink composition, generally in one or more of the oligomer or monomer materials used in the composition. Generally, the pigment comprises about 5 to about 60% of the dispersion. A dispersant may also be included to improve the stability of the pigment dispersion and/or to substantially reduce or eliminate agglomeration or settling of the pigment particles during manufacture of the ink, storage, and/or use. The dispersant can be selected from a variety of materials including silicones, and other monomers or oligomers having good wetting properties for the pigment.

The pigments generally are of a size that can be jetted from a print head without substantially clogging print nozzles, capillaries, or other components of print equipment. Pigment size can also have an effect on the final ink viscosity. The average particle size of the pigment is about 10 to about 750 nanometers, specifically less than about 500 nanometers, and more specifically less than about 350 nanometers. For example, the pigments can have a D50 of less than or equal 350 nanometers.

The ink compositions exhibit a desirable combination of low viscosity in liquid form and high elongation once cured, i.e., they have a viscosity at 25° C. of not greater than about 70 cPs, preferably not greater than 50 cPs, and even more preferably not greater than 30 cPs, and form a cured ink having an elongation of at least 150%. Generally, a cured ink exhibits little or no surface tack, as described in further detail below, but remains thermoformable. Elongation is measured using an Instron tensile tester using a 100 Newton load cell and a crosshead speed of 300 mm/min. Samples are prepared on Scotchcal 220 vinyl (either draw downs as prepared in tests as described in the Examples below or by jetting). Strips of ¼" width are cut and placed in the grips which are set 40 mm apart. The test is stopped when the vinyl breaks, the ink is observed to fracture on the vinyl, or the color of the ink is observed to fade/whiten. The percent elongation is then measured at the point where the test is stopped. Polycarbonate can also be used as the substrate in testing elongation if the Instron tester is equipped with an oven. Once the ink/polycarbonate sample is placed in the grips, the sample needs to be heated to 150° C. to soften the polycarbonate and allow it to be easily stretched. Viscosity may be measured using a Haake RV-1 rheometer with a C60/2 sensor and a TCP/P-Peltier Temperature Control Unit at 25° C. at a shear rate of 500 s$^{-1}$. In a more specific embodiment, the compositions have a viscosity at 25° C. of not greater than about 70 cPs, or, more specifically, not greater than about 50 cPs or even more specifically, not greater than 30 cPs.

The proportions of the monomer and reactive oligomer components described above can be controlled to obtain these properties in combination with a colorant. In a specific embodiment, the amount of the ethylenically unsaturated oligomer and any optional additional ethylenically unsaturated polyfunctional component combined, is less than the amount of the ethylenically unsaturated monofunctional monomer and any optional chain transfer agent combined. This minimizes crosslinking while increasing chain length and molecular weight in the cured compositions. In a more specific embodiment, the ink compositions comprise, based on the total weight of the ink, from about 5 to about 35 wt %, preferably about 5 to about 30 wt %, preferably about 10 to about 30 wt % and more preferably about 5 to about 25% wt % of the ethylenically unsaturated oligomer and any optional additional ethylenically unsaturated polyfunctional component, and from about 25 to about 80 wt %, preferably about 25 to about 75 wt %, preferably about 30 to about 75 wt % and more preferably about 5 to about 70 wt %, of the ethylenically unsaturated monofunctional monomer and any optional chain transfer agent combined.

In some embodiments containing additional polyfunctional component, and/or chain transfer agent, the compositions may comprise from about 5 to about 30 wt %, preferably about 10 to about 25 wt %, of the ethylenically unsaturated oligomer, from about 1 to about 15 wt % of the additional ethylenically unsaturated polyfunctional component, from about 25 to about 80 wt % of the ethylenically unsaturated monofunctional monomer, and from about 0 to about 25 wt % of the chain transfer agent.

In alternate embodiments, the compositions may comprise from about 5 to about 10 wt % of the ethylenically unsaturated oligomer, from about 3 to about 10 wt % of the additional ethylenically unsaturated polyfunctional component, from about 25 to about 80 wt % of the ethylenically unsaturated monofunctional monomer, and from about 0 to about 25 wt % of the chain transfer agent. In another embodiment, the compositions may comprise from about 5 to about 15 wt % of the ethylenically unsaturated oligomer, from about 1 to about 10 wt % of the additional ethylenically unsaturated polyfunctional component, from about 25 to about 80 wt % of the ethylenically unsaturated monofunctional monomer, and from about 0 to about 25 wt % of the chain transfer agent. In general, the colorant is used in an amount of about 0.01 to 25 wt. %, specifically about 0.05 to about 10 wt. %, and more specifically about 0.05 to about 7.5 wt. % of the total weight of the ink composition.

Optionally, colorant may be excluded from the compositions as described herein, wherein a colorless coating composition is formed. All of the disclosure set forth herein relating to the ink compositions, other than the colorant descriptions, is equally applicable to such colorless coating compositions.

In additional embodiments, the ink compositions preferably exhibit a surface tension such that the composition jets well and adequately wets out the substrate. In a specific embodiment, the ink compositions exhibit a surface tension of less than about 40 dynes/cm, more specifically less than about 36 dynes/cm, at 25° C.

The radiation curable ink compositions may also contain a polymerization initiator. Various photoinitiators are known in the art and may be selected based on the type of colorant present and the radiation wavelength used to cure the ink. A blend of photoinitiators can be used, having peak energy absorption levels at varying wavelengths within the range of the selected radiation for cure. Preferably, the photoinitiator and photoinitiator blends are sensitive to the wavelengths not absorbed, or only partially affected, by the pigment and/or dye colorant.

Examples of suitable photoinitiators include 2-benzyl-2-(dimethylamino)-4'-morpholinobutyrophenone; 2-hydroxy-2-methylpropiophenone; trimethylbenzophenone; methylbenzophenone; 1-hydroxycyclohexylphenyl ketone; isopropyl thioxanthone; 2,2-dimethyl-2-hydroxy-acetophenone; 2,2-dimethoxy-2-phenylacetophenone; 2-methyl-1-[4-(methylthio)phenyl]-2-morpholino-propan-1-one; 2,4,6-trimethylbenzyl-diphenyl-phosphine oxide; 1-chloro-4-propoxythioxanthone; benzophenone; bis(2,6-dimethoxybenzoyl)-2,4,4-trimethyl pentyl phosphine oxide; 1-phenyl-2-hydroxy-2-methyl propanone; bis(2,4,6-trimethylbenzoyl)phenylphosphine oxide; camphorquinone; and the like. Combinations comprising one or more the foregoing may also be used. Suitable commercially available photoinitiators include, but are not limited to Irgacure 907, Irgacure 819, Irgacure 2959, Irgacure 184, Irgacure 369, Irgacure 379, Irgacure 651 and Darocur D1173, commercially available from Ciba Specialty Chemicals ("Ciba") benzophenone, Genocure LBP, commercially available from Rahn, ITX SarCure SR1124 and TZT SarCure SR1137, commercially available from Sartomer, Chivacure BMS, commercially available from Chitec Technology Co., and combinations thereof.

The polymerization initiators are used in amounts effective to initiate polymerization in the presence of the curing radiation, typically about 3 to about 25 wt. %, specifically about 5 to about 20 wt. %, and more specifically about 5 to about 15 wt %, and more specifically, about 7 to about 15 wt. %, based on the total weight of the ink.

The photoinitiator composition can further contain a coinitiator for example, an amine coinitiator such as, for example, ethyl-4-(dimethylamino)benzoate, 2-ethylhexyl dimethylaminobenzoate, dimethylaminoethyl(meth)acrylate, or the like. Reactive amine polymerization coinitiators can be used, such as the coinitiator CN386 (a reactive amine adduct of tripropylene glycol diacrylate), commercially available from Sartomer, Darocure EHA, commercially available from Ciba, and the like. The coinitiator can be present in the ink in an amount of about 0.25 to about 20 wt. %, specifically about 1 to about 10 wt. %, and more specifically about 2 to about 7 wt. %, based on the total weight of the ink.

The ink compositions can also include, as additives, an ultraviolet light absorbing material ("UVA") and/or a hindered amine light stabilizer ("HALS") to provide photolytic stability to the ink. The UVA and or HALS can be added to the ink composition to improve the weatherability of the cured ink. These additives provide the retention of color through the lifetime of the cured ink. Commercial versions of UVAs include, but are not limited to Tinuvin 384-2, Tinuvin 1130, Tinuvin 405, Tinuvin 411L, Tinuvin 171, Tinuvin 400, Tinuvin 928, Tinuvin 99, combinations thereof, and the like. Commercially available examples of HALS include, but are not limited to Tinuvin 123, Tinuvin 292, Tinuvin 144, Tinuvin 152, combinations thereof, and the like. There are available as well combinations of UVA and HALS materials, useful in radiation curable inks, and commercially available as Tinuvin 5055, Tinuvin 5050, Tinuvin 5060, Tinuvin 5151. All Tinuvin products are commercially available from Ciba. It should be recognized that this list of compounds is exemplary and should not be considered as limited thereto.

Other additives can be included in the radiation curable ink compositions, including stabilizers, antioxidants, surfactants, and additional dispersion agents. When used, the stabilizers can be present in the ink in an amount of about 0.001 to about 2 wt. %, specifically about 0.01 to about 0.5 wt. %, and more specifically about 0.1 to about 0.3 wt. %, based on the total weight of the ink. Commercially available stabilizers include I-1035, commercially available from Ciba, and MEHQ (4-methoxyphenol), HQ (hydroquinone) and BHT (butylated hydroxyl toluene) commercially available from Sigma-Aldrich Corp, and G-1402 and G-16 commercially available from Rahn.

Surfactants can be used to adjust the surface tension of the ink to aid in wetting out low surface energy substrates. Wetting occurs where the adhesive forces between the ink and substrate are stronger than the cohesive forces of the ink. Without being bound by theory, it is believed that non-wetting performance, such as beading and contracting, correlates to stronger cohesive forces in the ink than adhesive forces between the ink and the substrate. Beading occurs where the ink, after application, forms a string of disconnected droplets instead of remaining a uniform coat as applied, and contracting occurs where the ink shrinks from the furthest extent of its initial application to a surface.

Surfactants suitable for use in the inks include, but are not limited to, polysiloxanes, polyacrylic copolymers, fluorine containing polymers, and the like. In a specific embodiment, these materials contain reactive groups that allow them to become part of the cured network. Suitable examples include Rad 2100, Rad 2200, Rad 2250, Rad 2300, Rad 2500, Rad 2600, and Rad 2700 commercially available from Degussa; CoatOSil 1211, CoatOSil 1301, CoatOSil 3500, CoatOSil 3503, CoatOSil 3509, and CoatOSil 3573 commercially available from GE Silicones; Byk-381, Byk-333, Byk-377, Byk-UV 3500, Byk-UV 3510, and Byk-UV 3530 commercially available from Byk Chemie; and FC-4430 and FC-4432 commercially available from 3M Corporation. An effective amount of surfactant where used, is from about 0.01 to about 2 wt %, specifically about 0.05 to about 1.5 wt %, more specifically about 0.1 to about 1 wt %, of the total weight of the ink composition.

The ink compositions of the invention are suitable for use in printing on various substrates, including polymers, cellulose substrates, including paper, and the like. Advantageously, the ink compositions are jettable from a variety of known inkjet print heads, whereby the inks are suitable for use in methods comprising the steps of jetting the ink onto a substrate to form a curable ink printed feature; and curing the ink printed feature. Conventional curing conditions may be employed and typically provide a tack-free surface. Suitably, the ink compositions are curable at for example 200, 700, 1000 or 1500 mJ/cm$^2$, or lower or higher levels as desired. The cured ink is thermoplastic and has an elongation of at least 150%, and in specific embodiments, at least 200%. Thus, the cured printed feature may undergo a forming process, for example a forming process wherein the printed feature on a substrate may be formed into a three-dimensional object at a temperature above the Tg of the substrate. Thus, in a specific embodiment, the cured ink composition has a Tg of at least 0° C. The forming process for forming the printed ink feature, for example on a polymer substrate, into a three-dimensional object may comprise any process known in the art. In a specific embodiment, a film insert molding process is employed, examples of which include high pressure forming, vacuum forming, thermoforming, and the like. The ink compositions of the invention can be employed to form ink printed three dimensional objects which exhibit no visible cracking of the ink, even in three-dimensional objects having rigorous dimensions, for example right angles and/or depth features of about 0.25 inches.

The following examples demonstrate various embodiments of the invention. Ink compositions are prepared, for example, by blending to form a homogeneous solution and filtering. Other techniques known in the art may also be employed. Unless otherwise specified, parts and percentages within the examples and the specification refer to parts by weight and percentages by weight, respectively.

EXAMPLES

Elongation is measured in accordance with the procedure described above. The following additional procedures and techniques employed in the Examples are described below.

Crosshatch adhesion was determined according to the following procedure: A film of an inkjet ink was prepared at a thickness of 9 micrometers using a #6 Mayer rod on the substrate indicated, cured using a mercury vapor lamp at a dose of 700 mJ/cm$^2$, and conditioned for 16-24 hours at 25° C. (±2° C.) at a relative humidity of 50% (±5%). A series of 6 parallel incisions of 2 to 2.5 cm in length and spaced 2.0 mm apart was made in the film using a suitable cutting tool such as a Gardco PA-2000 cutting tool with 6 parallel blades, followed by a second set of incisions of the same dimensions, rotated 90° to the first set forming a crosshatch pattern. The crosshatched surface was cleaned using a brush or compressed air to remove particulate contaminants. A length of 7 to 8 cm of a suitable tape, such as 3M 610 tape, available from 3M Corporation, was applied to the crosshatched area and rubbed smoothed to remove any trapped air bubbles and to ensure a good contact. The tape was then pulled off within 90 seconds (±30 seconds) upon application to the crosshatched area. The crosshatch areas were then quantified according to the method of ASTM D3359.

MEK Rub test: The MEK (methyl ethyl ketone) rub technique is a method for assessing the solvent resistance of a cured inkjet ink by incorporating ASTM D4752 into ASTM D3732-82. The ink to be cured was applied to a polyester ("PET"), polycarbonate ("PC") or vinyl substrate using #6 Mayer Rod. The coated film was cured using a Hanovia mercury vapor lamp (part No. 6812A431, max power 300 Watts/inch) at a dose of 700 mJ/cm$^2$ (dosage recorded by an IL390C radiometer from International Light). Test areas on the ink film surface of at least 2 inches long were selected for testing. The ball end of a hammer wrapped in two thicknesses of cheesecloth is saturated to a dripping wet condition with MEK. The wet ball end was rubbed across the 2-inch portion of the cured film, one forward and one backward movement constitutes a single rub. The surface is rubbed until the ink has been completely removed from any point along the test area or after 200 MEK rubs, whichever comes first. The number of rubs required to expose the substrate was recorded.

Degree of cure: The degree of cure of the ink was determined by measuring percent reacted acrylate unsaturation ("% RAU") of the cured ink using a Nicolet 860 Magna FT-IR bench equipped with a Durasampl IR II ATR (Diamond). A drop of liquid inkjet ink was placed onto the diamond ATR crystal and a spectrum of the unreacted liquid ink was obtained. A cured film of ink was prepared for spectral analysis by forming a film of ink having a thickness of about 7-10 micrometers using #6 Mayer rod drawdown over a polyethylene terephthalate ("PET") substrate. The ink film was then cured using the described Hanovia mercury vapor lamp, at a specified dose. The cured ink film was removed from the substrate and the top surface and the bottom surface of the film (the face adjacent to the substrate) were measured for degree of cure. The degree of cure at the top surface of the film ("TOP RAU %") was determined by cutting a piece of ink film (about ½"×½") and having the top surface of the film face the diamond ATR crystal while a spectrum was obtained. The degree of cure at the face of the film opposite to the surface (Bottom RAU %) was obtained by facing the bottom surface of the film to the diamond ATR crystal while a spectrum was obtained. The carbon-carbon bond of the acrylate functionality was observed in the cured ink at about 1410 cm$^{-1}$.

Example 1

This Example 1 demonstrates a Cyan ink composition containing oligomers (CN966H90 and CN-131), monofunctional monomer (SR 285 and SR 395), and a chain transfer agent (2-(acetoacetoxy)ethyl methacrylate, AAEMA). The oligomers acting as a template for providing high elongation. The acidic hydrogens in the acetoacetate moiety are capable of chain transfer and the methacrylate group in the AAEMA may possibly slowly undergo free radical polymerization with other reactive monomers and oligomers in the ink. The cyan pigment dispersion comprises 20% pigment CI: 15:3 in tripropylene glycol diacylate. The complete formulation is set forth in Table 1:

TABLE 1

Ink Composition

| Example 1 | Wt % |
| --- | --- |
| SR 285 | 15 |
| SR 395 | 4 |
| CN966H90 | 12 |
| CN131@ | 15 |
| CN 386 | 3.7 |
| AAEMA | 23 |
| I-1035 | 1 |
| I-369 | 3.5 |
| Darocur-1173 | 3 |
| TZT | 2.5 |
| HQ | 0.1 |
| I-184 | 0.93 |
| Genocure MBF | 3 |
| ITX | 0.4 |
| Cyan Pigment Dispersion | 12.5 |
| Total | 100.0 |

The ink composition had a viscosity (Haake at 25° C.) of 71.6 cPs. The composition was applied to various substrates and cured using a Hanovia mercury vapor lamp, and was subjected to measurement of percent cure, elongation, cross-hatch adhesion and MEK rub properties, the results of which are set forth in Tables 2 and 3:

TABLE 2

% Cure and Elongation

| Testing | Conditions | Results |
| --- | --- | --- |
| % Cure @ 700 mJ/cm² (1410 cm⁻¹ acrylate peak), PET, H Lamp | Top | 36.8% |
| | Bottom | CD |
| % Cure @ 1000 mJ/cm² (1410 cm⁻¹ acrylate peak), PET, H Lamp | Top | 98.4% |
| | Bottom | CD |
| % Cure @ 1500 mJ/cm² (1410 cm⁻¹ acrylate peak), PET, H Lamp | Top | 100% |
| | Bottom | CD |
| % Elongation on Vinyl | H lamp, @ 1000 mJ/cm2 | 255% |
| % Elongation on Vinyl | H Lamp, @ 1500 mJ/cm2 | 262% |
| % Elongation on PC | H lamp, @ 1000 mJ/cm2 | 89% |
| % Elongation on PC | H Lamp, @ 1500 mJ/cm2 | 91% |

CD = cannot determine, as 610 tape could not remove the ink from the PET substrate

TABLE 3

Adhesion and MEK Properties of Cured Compositions

| Substrates | Dose under Hanovia H lamp | Testing | Results |
| --- | --- | --- | --- |
| Polyethylene terephthalate (PET) | 1000 mJ/cm² | MEK Rubs | 0 |
| | | X-hatch Adhesion | 5B |
| | 1500 mJ/cm² | MEK Rubs | 1 |
| | | X-hatch Adhesion | 5B |
| Vinyl | 1000 mJ/cm² | MEK Rubs | 0 |
| | | X-hatch Adhesion | 5B |
| | 1500 mJ/cm² | MEK Rubs | 0 |
| | | X-hatch Adhesion | 5B |
| Polycarbonate (PC) | 1000 mJ/cm² | MEK Rubs | 0 |
| | | X-hatch Adhesion | 5B |
| | 1500 mJ/cm² | MEK Rubs | 0 |
| | | X-hatch Adhesion | 5B |
| Glass | 1000 mJ/cm² | MEK Rubs | 1 |
| | | X-hatch Adhesion | 5B |
| | 1500 mJ/cm² | MEK Rubs | 1 |
| | | X-hatch Adhesion | 4B |

The cured ink compositions exhibited jettable viscosity and sufficient curing as well as good elongation and adhesion.

Example 2

This Example 2 demonstrates cyan ink compositions containing oligomers (CN966H90, CN-131 and CN-3100), and monofunctional monomer (SR 285 and SR 395), without a chain transfer agent. The oligomers acting as a template for providing high elongation. The cyan pigment dispersion comprises 20% pigment CI: 15:3 in tripropylene glycol diacylate. The complete formulations are set forth in Table 4:

TABLE 4

Ink Composition

| Component | 2A | 2B |
| --- | --- | --- |
| SR 285 | 26 | 26 |
| SR 395 | 14 | 14 |
| CN966H90 | 12 | 12 |
| CN 131 | 15 | |
| CN 3100 | | 15 |
| CN 386 | 3.5 | 3.5 |
| I-1035 | 1 | 1 |
| I-369 | 3.5 | 3.5 |
| Darocur 1173 | 3 | 3 |
| TZT | 2.5 | 2.5 |
| HQ | 0.1 | 0.1 |
| I-184 | 1 | 1 |
| Genocure MBF | 3 | 3 |
| ITX | 0.4 | 0.4 |
| Cyan Pigment Dispersion | 15 | 15 |
| Total | 100.0 | 100.0 |

The ink compositions 2A and 2B exhibited viscosities (Haake at 25° C.) of 52.0 and 54.3 cPs, respectively. The compositions were applied to various substrates cured using a Hanovia mercury vapor lamp, and subjected to measurement of elongation, cross hatch adhesion and MEK rub properties, the results of which are set forth in Tables 5 and 6:

TABLE 5

% Elongation

| | | 2A | 2B |
| Testing | Conditions | Results | |
| --- | --- | --- | --- |
| Elongation on Vinyl cured | H lamp, @ 1000 mJ/cm² | 246% | 151% |
| Elongation on Vinyl cured | H Lamp, @ 1500 mJ/cm² | 254% | 153% |

TABLE 6

Adhesion and MEK

| Conditions Substrates | Dose under Hanovia H lamp | 2A Adhesion & MEK Rubs | Values | 2B Adhesion & MEK Rubs | Values |
|---|---|---|---|---|---|
| Polyethylene terephthalate (PET) | 1000 mJ/cm² | MEK Rubs X-hatch Adhesion | 0 5B | MEK Rubs X-hatch Adhesion | 1 5B |
| Glass | 1000 mJ/cm² | MEK Rubs X-hatch Adhesion | 1 1B | MEK Rubs X-hatch Adhesion | 1 1B |
| Aluminum | 1000 mJ/cm² | MEK Rubs X-hatch Adhesion | 0 4B | MEK Rubs X-hatch Adhesion | 0 2B |

These compositions exhibited a jettable viscosity and upon curing, good elongation and adhesion without any surface tack.

Example 3

This Example 3 demonstrates cyan ink compositions containing oligomer (CN966H90), polyfunctional oligomer (silicone hexaacrylate, EB 1360 from Cytec Surface Specialties), and monofunctional monomer (CD 420 and, from the pigment dispersion, SR 256). The oligomer acting as a template for providing high elongation. The silicone component helped surface migration and circumvented surface cure issues. Tego Rad 2200 also acted as a surface slip agent to help control wetting and reduce the coefficient of friction. The cyan pigment dispersion comprised 20% pigment CI: 15:3 in SR 256. The complete formulations are set forth in Table 7:

TABLE 7

Ink Compositions:

| Component | 3A | 3B | 3C | 3D |
|---|---|---|---|---|
| CN966H90 | 10.00 | 8.00 | 6.00 | 4.00 |
| CD 420 | 49.60 | 49.60 | 49.60 | 49.60 |
| EB 1360 | 6.00 | 8.00 | 10.00 | 12.00 |
| CN386 | 3.4 | 3.4 | 3.4 | 3.4 |
| I-819 | 1.7 | 1.7 | 1.7 | 1.7 |
| TPO-L | 3.5 | 3.5 | 3.5 | 3.5 |
| Genocure MBF | 3 | 3 | 3 | 3 |
| Darocur 1173 | 0.8 | 0.8 | 0.8 | 0.8 |
| Irgacure 369 | 2.5 | 2.5 | 2.5 | 2.5 |
| ITX | 1 | 1 | 1 | 1 |
| V-Cap | 1.50 | 1.50 | 1.50 | 1.50 |
| Tego Rad 2200 | 4.00 | 4.00 | 4.00 | 4.00 |
| Cyan Pigment Dispersion | 13.00 | 13.00 | 13.00 | 13.00 |
| Total | 100.00 | 100.00 | 100.00 | 100.00 |

The ink compositions 3A-3D exhibited low viscosities (Haake at 25° C.) as set forth in Table 8. The compositions were applied to various substrates, cured using a Hanovia mercury vapor lamp, and subjected to measurement of elongation, cross hatch adhesion and MEK rub properties as set forth in Table 8:

TABLE 8

Properties

| Tests | | 3A | 3B | 3C | 3D |
|---|---|---|---|---|---|
| 25° C. Viscosity | (cps) | 39.4 | 34.6 | 30.4 | 28.2 |
| Hanovia, H Bulb 700 mJ/cm² | | | | | |
| Initial Cure (i.e. are the films tacky) | | Cured but Some what tacky over time | Cured but Some what tacky over time | Cured but Some what tacky over time | Cured but Some what tacky over time |
| Elongation | (%) | 220 | 219 | 232 | 222 |
| Observation upon Elongation at 200% | | No cracking | No cracking | No cracking | No cracking |
| X-Hatch Adhesion on Vinyl | | 5B | 5B | 5B | 5B |
| X-Hatch Adhesion on PC | | 5B | | | |
| X-Hatch Adhesion on PET | | 5B | | | |
| X-Hatch Adhesion on Aluminum | | 5B | | | |
| X-Hatch Adhesion on Stainless Steel | | 5B | | | |
| MEK Rubs on Vinyl | | 2 | | | |
| MEK Rubs on PC | | 0 | | | |
| MEK Rubs on PET | | 0 | | | |
| MEK Rubs on Aluminum | | 0 | | | |
| MEK Rubs on Stainless Steel | | 0 | | | |

TABLE 8-continued

| | | Properties | | | |
|---|---|---|---|---|---|
| Tests | | 3A | 3B | 3C | 3D |
| 25° C. Viscosity | (cps) | 39.4 | 34.6 | 30.4 | 28.2 |
| | | Hanovia, H Bulb 700 mJ/cm$^2$ | | | |
| % Top Cure by FTIR, 1410 peak cm$^{-1}$ (PET Substrate) | | 100% | | | |
| % Bottom Cure by FTIR, 1410 peak cm$^{-1}$ (PET Substrate) | | CD | | | |

CD - cannot be determined due to good adheasion to the PET substrate

Compositions 3A-3D exhibited a % elongation of >200% on vinyl. The cured inks also showed good cross hatch adhesion over vinyl substrates. Therefore, these inks should also provide excellent adhesion to all substrates including stainless steel, aluminum and glass, as shown by composition 3A in Table 8. While not intending to be bound by theory, adhesion to the substrate is believed to be due to the physical adhesion phenomenon resulting from low shrinkage.

Example 4

This Example 4 demonstrates cyan ink compositions containing oligomers (CN966H90 and CN3100) and monofunctional monomer (CD 420). The oligomers acting as a template for providing high elongation. Gelest SMS-042 is a mercapto-siloxane which improves surface cure and acts as a chain transfer agent. Tego Rad 2200 was also included and acted as a surface slip agent to help control wetting and reduce coefficient of friction. The cyan pigment dispersion comprised 20% pigment CI: 15:3 in tripropylene glycol diacrylate. The complete formulations are set forth in Table 9:

TABLE 9

| | Ink Compositions | | | | | | |
|---|---|---|---|---|---|---|---|
| Component | 4A | 4B | 4C | 4D | 4E | 4F | 4G |
| CD 420 | 35.6 | 39.6 | 37.6 | 35.6 | 33.6 | 31.6 | 29.6 |
| CN966H90 | 14 | 8 | 8 | 8 | 8 | 8 | 8 |
| CN3100 | 13 | 15 | 17 | 19 | 21 | 23 | 25 |
| CN 386 | 3.4 | 3.4 | 3.4 | 3.4 | 3.4 | 3.4 | 3.4 |
| I-369 | 3.5 | 3.5 | 3.5 | 3.5 | 3.5 | 3.5 | 3.5 |
| Darocur 1173 | 3 | 3 | 3 | 3 | 3 | 3 | 3 |
| Irgacure 184 | 1 | 1 | 1 | 1 | 1 | 1 | 1 |
| Gelest SMS-042 | 3 | 3 | 3 | 3 | 3 | 3 | 3 |
| Genocure LBP | 2.5 | 2.5 | 2.5 | 2.5 | 2.5 | 2.5 | 2.5 |
| Genocure MBF | 1.5 | 1.5 | 1.5 | 1.5 | 1.5 | 1.5 | 1.5 |
| ITX | 1 | 1 | 1 | 1 | 1. | 1 | 1 |
| Tego Rad 2200 | 2 | 2 | 2 | 2 | 2 | 2 | 2 |
| V-cap | 1.5 | 1.5 | 1.5 | 1.5 | 1.5 | 1.5 | 1.5 |
| Cyan Pigment Dispersion | 15 000 | 15 000 | 15 000 | 15 000 | 15 000 | 15 000 | 15 000 |
| Total | 100.00 | 100.00 | 100.00 | 100.00 | 100.00 | 100.00 | 100.00 |

The ink compositions 4A-4G had viscosities (Haake at 25° C.) as set forth in Table 10. The compositions were applied to vinyl substrate, cured using a Hanovia mercury vapor lamp, and subjected to measurement of elongation, the results of which are set forth in Table 10:

TABLE 10

| | Viscosity and Elongation | | | | | | |
|---|---|---|---|---|---|---|---|
| Testing | 4A | 4B | 4C | 4D | 4E | 4F | 4G |
| Viscosity | 94.65 | 46.98 | 52.99 | 57.84 | 64.17 | 71.66 | 81.31 |
| % Elongation on vinyl, film cured at 700 mJ/cm$^2$ | 159 | 164 | 156 | 161 | 151 | 158 | 161 |

These compositions exhibited jettable viscosities and, upon curing, good elongation without any surface tack.

Example 5

This Example 5 demonstrates a cyan ink composition containing oligomers (CN966H90 and CN3100) and monofunctional monomer (CD 420). The oligomers acting as a template for providing high elongation. The cyan pigment dispersion comprises 20% pigment CI: 15:3 in tripropylene glycol diacrylate. The complete formulation is set forth in Table 11:

TABLE 11

| Ink Compositions | |
|---|---|
| Component | Wt % |
| CN966H90 | 8.00 |
| CD420 | 46.60 |
| CN3100 | 13.00 |
| CN386 | 3.40 |
| Genocure MBF | 1.50 |
| Genocure LBP | 2.50 |
| Darocure 1173 | 3.00 |
| Irgacure 369 | 3.50 |
| Irgacure 184 | 1.00 |
| ITX | 1.00 |
| V-Cap | 1.50 |
| Cyan Pigment Dispersion | 15.0 |
| Total | 100.00 |

The ink composition of this example exhibited low viscosity and good cure at 700 mJ/cm² under the Hanovia mercury vapor lamp. The properties of the composition and cured ink are set forth in Table 12. The cured composition exhibited good elongation of up to 190% as well as high gloss and good cross hatch adhesion over the vinyl substrate.

TABLE 12

| Properties | |
|---|---|
| Properties | Example 5 |
| Viscosity @ 25° C. | 30 |
| Gloss | 95.10 |
| Initial cure (H Bulb, 700 mJ/cm²) | Cured |
| X-Hatch Adhesion over vinyl | 3B |
| MEK rubs | 0 |
| % Elongation over vinyl | 190 |

Example 6

This Example 6 demonstrates cyan ink compositions containing oligomer (CN966H90 and CN3100) and monofunctional monomer (CD 420). The oligomers acting as a template for providing high elongation. Gelest SMS-042 is a mercapto-siloxane chain transfer agent which improves surface cure. Tego Rad 2200 was also included and acts as a surface slip agent to help control wetting and reduce coefficient of friction. The cyan pigment dispersion comprised 20% pigment CI: 15:3 in tripropylene glycol diacrylate. The complete formulations are set forth in Table 13:

TABLE 13

| Ink Compositions | | | | |
|---|---|---|---|---|
| Component | 6A | 6B | 6C | 6D |
| CN966H90 | 8.00 | 9.00 | 10.00 | 8.00 |
| Gelest SMS-042 | 2.00 | 2.00 | 2.00 | 2.00 |
| CD420 | 44.60 | 43.60 | 42.60 | 44.10 |
| CN3100 | 13.00 | 13.00 | 13.00 | 13.00 |
| Tego Rad 2200 | | | | 0.50 |
| CN386 | 3.40 | 3.40 | 3.40 | 3.40 |
| Genocure MBF | 1.50 | 1.50 | 1.50 | 1.50 |
| Genocure LBP | 2.50 | 2.50 | 2.50 | 2.50 |
| Darocur 1173 | 3.00 | 3.00 | 3.00 | 3.00 |
| Irgacure 369 | 3.50 | 3.50 | 3.50 | 3.50 |
| Irgacure 184 | 1.00 | 1.00 | 1.00 | 1.00 |
| ITX | 1.00 | 1.00 | 1.00 | 1.00 |
| V-Cap | 1.50 | 1.50 | 1.50 | 1.50 |
| Cyan Pigment Dispersion | 15.00 | 15.00 | 15.00 | 15.00 |
| Total | 100.00 | 100.00 | 100.00 | 100.00 |

The properties of the ink compositions and the cured inks are described in Table 14. The inks exhibited good cure at 700 mJ/cm² under the Hanovia mercury vapor lamp and upon cure, exhibited good elongation of >200% over the vinyl substrate.

TABLE 14

| Properties | | | | |
|---|---|---|---|---|
| Properties | 6A | 6B | 6C | 6D |
| 25° C. Viscosity (cps) | 35 | 40 | 48 | 36 |
| Initial Cure H Bulb 700 mJ/cm² | Cured | Cured | Cured | Cured |
| Cross Hatch | 5B | 5B | 5B | 5B |
| MEK Rubs | 2 | 2 | 2 | 2 |
| % Elongation | 217 | 216 | 201 | 220 |

Example 7

This Example 7 demonstrates a Black ink composition containing oligomers (CN966H90 and optionally CN3100) and monofunctional monomer (CD 420). The oligomers acting as a template for providing high elongation. Tego Rad 2200 acts as a surface slip agent to help control wetting and reduce coefficient of friction. The black pigment dispersion comprised 20% carbon black pigment CI: 7 in tripropylene glycol diacrylate. The complete formulations are set forth in Table 15:

TABLE 15

| Ink Compositions | | | | | | |
|---|---|---|---|---|---|---|
| Component | 7A | 7B | 7C | 7D | 7E | 7F |
| CN966H90 | 13.00 | 11.00 | 13.00 | 10.00 | 10.00 | 10.00 |
| CD 420 | 48.40 | 48.40 | 48.40 | 59.40 | 57.40 | 48.40 |
| CN3100 | 8.00 | 8.00 | 6.00 | | | 9.00 |
| CN386 | 3.40 | 3.40 | 3.40 | 3.40 | 3.40 | 3.40 |
| I-819 | 1.70 | 1.70 | 1.70 | 1.70 | 1.70 | 1.70 |
| TPO-L | 3.50 | 3.50 | 3.50 | 3.50 | 3.50 | 3.50 |
| Genocure MBF | 3.00 | 3.00 | 3.00 | 3.00 | 3.00 | 3.00 |
| Darocur 1173 | 0.80 | 0.80 | 0.80 | 0.80 | 0.80 | 0.80 |
| Irgacure 369 | 2.50 | 2.50 | 2.50 | 2.50 | 2.50 | 2.50 |
| ITX | 1.00 | 1.00 | 1.00 | 1.00 | 1.00 | 1.00 |
| V-Cap | 1.50 | 1.50 | 1.50 | 1.50 | 1.50 | 1.50 |
| Tego-2200 | 2.00 | 4.00 | 4.00 | 2.00 | 4.00 | 4.00 |
| Black Pigment | 11.20 | 11.20 | 11.20 | 11.20 | 11.20 | 11.20 |

TABLE 15-continued

| | Ink Compositions | | | | | |
|---|---|---|---|---|---|---|
| Component | 7A | 7B | 7C | 7D | 7E | 7F |
| Dispersion | 000 | 000 | 000 | 000 | 000 | 000 |
| Total | 100.00 | 100.00 | 100.00 | 100.00 | 100.00 | 100.00 |

The properties of the ink compositions and cured inks are set forth in Table 16. The cured inks exhibited good elongation and crosshatch adhesion over the vinyl substrate. The inks appear to cure at 700 mJ/cm$^2$ using the Hanovia mercury vapor lamp.

TABLE 16

| | Properties | | | | | |
|---|---|---|---|---|---|---|
| Properties | 7A | 7B | 7C | 7D | 7E | 7F |
| Viscosity Haake @ 25° C. | 49.2 | 43.6 | 50.7 | 22.3 | 25.0 | 40.2 |
| Substrate | Adhesion | | | | | |
| PET | 0B | 1B | 0B | 1B | 0B | 5B |
| PC | 5B | 4B | 3B | 3B | 4B | 3B |
| Vinyl | 5B | 5B | 5B | 0B | 0B | 0B |
| Aluminum | 0B | 0B | 0B | 0B | 0B | 0B |
| Stainless Steel | 0B | 0B | 0B | 0B | 0B | 0B |
| | MEK Rubs | | | | | |
| PET | 2 | 2 | 2 | 2 | 2 | 2 |
| PC | 3 | 2 | 2 | 3 | 3 | 2 |
| Vinyl | 3 | 2 | 2 | 2 | 2 | 2 |
| Aluminum | 2 | 2 | 2 | 2 | 2 | 2 |
| Stainless Steel | 2 | 2 | 2 | 2 | 2 | 2 |
| % Elongation | 237 | 267 | 247 | 230 | 232 | 233 |

Example 8

This Example 8 demonstrates cyan ink compositions containing oligomers (CN966H90 and CN3100) and monofunctional monomer (Isodecyl acrylate and Tetrahydrofurfuryl acrylate, or Trimethylcyclohexane acrylate). The oligomers acting as a template for providing high elongation. The cyan pigment dispersion comprises 20% pigment CI: 15:3 in SR 256. The complete formulations are set forth in Table 17, together with viscosity and surface cure properties.

TABLE 17

| | Ink Compositions | |
|---|---|---|
| Component | 8A | 8B |
| CN966H90 Urethane oligomer | 8% | 8% |
| Isodecyl acrylate | 22.6% | — |
| Tetrahydrofurfuryl acrylate | 24% | — |
| Trimethylcyclohexane acrylate | — | 46.6% |
| CN3100 Urethane oligomer | 13% | 13% |
| N-vinyl caprolactam | 1.5% | 1.5% |
| CN386 Acrylated amine | 3.4 | 3.4 |
| Methylbenzoylformate | 1.5% | 1.5% |
| Blend of benzophenone and methylbenzophenone | 2.5% | 2.5% |
| 2-Hydroxy-2-methyl-1-phenyl-1-propanone | 3% | 3% |
| 2-Benzyl-2-(dimethylamino)-1-[4-(4-morpholino)phenyl]-1-butanone | 3.5% | 3.5% |
| 1-Hydroxycyclohexylphenylketone | 1% | 1% |
| Isopropyl thioxanthone | 1% | 1% |
| Cyan Dispersion | 15% | 15% |
| Property | | |
| Surface Cure | Tacky/Wet | Tack-Free |
| Viscosity (cPs) | 25 | 30 |

Both compositions exhibited low viscosity while composition 8B further exhibited tack free cure. The cured inks exhibited elongation over vinyl of >200% without visibly cracking.

Example 9

This Example 9 demonstrates cyan ink compositions formulated using monofunctional acrylates (CD 420 and acrylate from the cyan pigment dispersion) along with several oligomers (CN966H90, CN996, CN966J75, CN3100) and several acrylated and non-acrylated slip agents (SMS-042, Tego Rad 2200). The resulting network structure was provided by SR9035, an ethoxylated trimethylol propane triacrylate, which acts as a cross linker. The mono-functional acrylate monomers typically range from 60 to 64 wt %. The complete formulations are set forth in Table 18.

TABLE 18

| | Ink Compositions | | | | | | | | | | |
|---|---|---|---|---|---|---|---|---|---|---|---|
| Component | 9A | 9B | 9C | 9D | 9E | 9F | 9G | 9H | 9I | 9J | 9K |
| CN966H90 | 8.00 | 6.00 | 4.00 | | 6.60 | | | 4.60 | | 4.6 | 4.6 |
| CN996 | | | | 12.60 | 6.00 | 9.00 | | 8.00 | 8.00 | 8.00 | 8.00 |
| CN966J75 | | | | | | | 9.00 | | | | |
| CN3100 | | | | | | 6.00 | 6.00 | | | | |
| CD 420 | 49.60 | 49.60 | 48.60 | 49.60 | 49.60 | 48.40 | 48.40 | 49.60 | 49.70 | 49.50 | 49.50 |
| SR 9035 | 8.00 | 10.00 | 12.00 | 8.00 | 8.00 | 6.00 | 6.00 | 8.00 | 8.40 | 8.00 | 8.00 |
| Darocure EHA | | | | | | | | | | 1.60 | 1.60 |
| CN386 | 3.40 | 3.40 | 3.40 | 3.40 | 3.40 | 3.40 | 3.40 | 3.40 | 3.40 | | |
| Genocure LBP | | | | | | | | | 1.00 | 1.80 | 1.80 |
| I-819 | 1.70 | 1.70 | 1.70 | 1.70 | 1.70 | 1.70 | 1.70 | 1.70 | 1.70 | 1.70 | 1.70 |
| TPO-L | 3.50 | 3.50 | 3.50 | 3.50 | 3.50 | 3.50 | 3.50 | 3.50 | 3.50 | 3.50 | 3.50 |
| MBF | 3.00 | 3.00 | 3.00 | | | | | | 3.00 | | |
| Darocur 1173 | 0.80 | 0.80 | 0.80 | 0.80 | 0.80 | 0.80 | 0.80 | 0.80 | 0.80 | 0.80 | 0.80 |
| Irgacure 369 | 2.50 | 2.50 | 2.50 | 2.50 | 2.50 | 2.50 | 2.50 | 2.50 | 2.50 | 2.50 | 2.50 |
| ITX | 1.00 | 1.00 | 1.00 | 1.00 | 1.00 | 1.00 | 1.00 | 1.00 | 1.00 | 1.00 | 1.00 |
| EB 1360 | | | | | | | | | | | |
| Gelest SMS-042 | | | | 1.9 | 1.9 | 1.1 | 1.1 | 1.9 | | 2.00 | |

TABLE 18-continued

| | Ink Compositions | | | | | | | | | | |
|---|---|---|---|---|---|---|---|---|---|---|---|
| Component | 9A | 9B | 9C | 9D | 9E | 9F | 9G | 9H | 9I | 9J | 9K |
| V-Cap | 1.50 | 1.50 | 1.50 | 2.00 | 2.00 | 1.60 | 1.60 | 2.00 | | 2.00 | 4.00 |
| Tego Rad 2200 | 4.00 | 4.00 | 4.00 | | | 2.00 | 2.00 | | | | |
| Cyan Dispersion in 2(2-ethoxy ethoxy) ethyl acrylate | 13.00 | 13.00 | 14.00 | | | | | | | | |
| Cyan Dispersion in Tripropylene glycol methyl ether monoacrylate | 000 | 000 | 000 | 13.00 000 | 13.00 000 | 13.00 000 | 13.00 000 | 13.00 000 | 15.00 | 13.00 000 | 13.00 000 |
| Total | 100.00 | 100.00 | 100.00 | 100.00 | 100.00 | 100.00 | 100.00 | 100.00 | 100.00 | 100.00 | 100.00 |

The properties of the ink compositions and cured inks are set for the in Table 19. Cyan ink 9E exhibited minimal cracking with excellent adhesion to the vinyl substrate. The ink exhibited a viscosity of 40 cps. The mono-acrylate content in this ink was about 63%. The ink also contained a slip additive SMS-042, which is a thiol based siloxane as described above, which also provided excellent surface cure characteristics.

TABLE 19

| | Properties | | | | | | | | | | |
|---|---|---|---|---|---|---|---|---|---|---|---|
| Properties | 9A | 9B | 9C | 9D | 9E | 9F | 9G | 9H | 9I | 9J | 9K |
| Viscosity @ 25° C. | 25.8 | 23.1 | 20.6 | 33.1 | 40.8 | 34.2 | 35.4 | 38.7 | 25.7 | 37.8 | N/A |
| % Elongation | 233 | 213 | 179 | 173 | 183 | 204 | 242 | 191 | 186 | 194 | 195 |
| Adhesion over Vinyl | 4B | 5B | 5B | 5B | 5B | 5B | 5B | 5B | 5B | 5B | 5B |
| MEK Rubs over vinyl | 11 | 7 | 8 | 0 | 15 | 1 | 1 | 3 | 1 | 2 | 4 |
| Cure (determine based on ink transfer on the paper | Some transfer | Some transfer | Some transfer | No transfer | No transfer | No transfer | No transfer | No transfer | No transfer | No transfer | No transfer |
| Any cracking upon thermoformimg | N/A | N/A | N/A | some cracking | no cracking | no cracking | slight cracking | slight cracking | cracking | cracking | slight cracking |

Example 10

This Example 10 demonstrates cyan inks formulated using mono-functional acrylates along with a combination of urethane acrylates (CN966H90, CN966) and surfactant BYK 377. The resulting network structure is provided by Ebecryl 1360 (EB1360) which is a hexa-functional silicone. The inks are formulated with monoacrylate monomer functionality below 64% (CD420 and cyan dispersion monomer). The complete formulations are set forth in Table 20.

TABLE 20

| | Ink Compositions | | | |
|---|---|---|---|---|
| Component | 10A | 10B | 10C | 10D |
| CN966H90 | 6.60 | 4.60 | 2.60 | 1.00 |
| CN996 | 6.00 | 8.00 | 10.00 | 11.60 |
| CD 420 | 49.60 | 49.60 | 49.60 | 49.60 |
| EB 1360 | 8.00 | 8.00 | 8.00 | 8.00 |
| Darocure EHA | 2.00 | 2.00 | 2.00 | 2.00 |
| I-819 | 1.70 | 1.70 | 1.70 | 1.70 |
| TPO-L | 3.50 | 3.50 | 3.50 | 3.50 |
| Genocure LBP | 2.00 | 2.00 | 2.00 | 2.00 |
| Darocur 1173 | 2.10 | 2.10 | 2.10 | 2.10 |

TABLE 20-continued

| | Ink Compositions | | | |
|---|---|---|---|---|
| Component | 10A | 10B | 10C | 10D |
| Irgacure 369 | 2.50 | 2.50 | 2.50 | 2.50 |
| ITX | 1.00 | 1.00 | 1.00 | 1.00 |
| BYK 377 | 2 | 2 | 2 | 2 |
| V-Cap | 2.00 | 2.00 | 2.00 | 2.00 |
| Cyan Dispersion in tripropylene glycol methyl ether monoacrylate | 11.00 | 11.00 | 11.00 | 11.00 |
| Total | 100.00 | 100.00 | 100.00 | 100.00 |

Table 21 provides the viscosity, % elongation, adhesion and MEK rubs of the compositions and demonstrates that the cyan inks show excellent % elongation as high as 247%. The presence of silicone hexaacrylate not only provided a smooth and tack free surface but also provided the desired flexibility due to the silicone backbone. The inks also contain a surfactant that helps provides slip characteristics to the cured surface.

TABLE 21

| Results | Properties | | | |
|---|---|---|---|---|
| | 10A | 10B | 10C | 10D |
| Viscosity @ 25° C. | 55.86 | 51.28 | 49.40 | 45.70 |
| Initial Cure (tackiness test via thumb test) | Some ink transfer | No | No | No |
| Elongation | 228 | 247 | 235 | 235 |
| Observation on Elongation at 200%, over slide | No Cracking | No Cracking | No Cracking | No Cracking |
| Adhesion over Vinyl | 5B | 5B | 5B | 5B |
| MEK rubs over vinyl | 2 | 2 | 2 | 2 |
| Comments during elongation | snapped | snapped | snapped | snapped |

Example 11

This Example 11 demonstrates cyan inks formulated with a combination of mono functional acrylates (CD420 and cyan dispersion monomers), acrylate oligomers (CN966J75, CN966H90, CN996, Genomer 1122, CN3100), surfactant (EB1360, EB350). The ink flexibility is provided by the silicone acrylate backbone of EB1360 or EB350. Additionally, a non-reactive plasticizer, propylene carbonate, acts to further improve flexibility. The complete formulations are set forth in Table 22.

TABLE 22

| | Ink Compositions | | | | | | | | | |
|---|---|---|---|---|---|---|---|---|---|---|
| Component | 11A | 11B | 11C | 11D | 11E | 11F | 11G | 11H | 11I | 11J |
| CN966J75 | | | 5.10 | 5 | 5 | 5 | 5 | 5 | 5 | 7 |
| CN966H90 | 3.60 | 3.60 | | | | | | | | |
| CN996 | 8.00 | 8.00 | 5.10 | | | | 5 | | | 5 |
| Geromer 1122 | | | | | | | | 5 | 7 | |
| CN 3100 | | | | 6 | 6 | 6 | | | | |
| CD 420 | 49.50 | 49.50 | 50.00 | 49.00 | 49.00 | 49.00 | 49.00 | 49.00 | 49.00 | 49.00 |
| EB1360 | 8.00 | | 8.16 | 8.00 | 8.00 | 8.00 | 8.00 | 8.00 | 8.00 | 8.00 |
| EB350 | | 8.00 | | | | | | | | |
| Propylene Carbonate | 3.00 | 3.00 | 2.02 | 2.00 | 2.00 | 2.00 | 2.00 | 2.00 | 2.00 | 2.00 |
| Daracure EHA | 1.60 | 1.60 | 2.02 | 2.00 | 2.00 | 2.00 | 2.00 | 2.00 | 2.00 | 2.00 |
| Genocure LBP | 1.80 | 1.80 | 2.02 | 2.00 | 2.00 | 2.00 | 2.00 | 2.00 | 2.00 | 2.00 |
| I-819 | 1.70 | 1.70 | 1.73 | 1.70 | 1.70 | 1.70 | 1.70 | 1.70 | 1.70 | 1.70 |
| TPO-L | 3.50 | 3.50 | 3.57 | 3.50 | 3.50 | 3.50 | 3.50 | 3.50 | 3.50 | 3.50 |
| Darocur 1173 | 0.80 | 0.80 | 1.33 | 1.30 | 1.30 | 1.30 | 1.30 | 1.30 | 1.30 | 1.30 |
| Irgacure 369 | 2.50 | 2.50 | 2.55 | 2.50 | 2.50 | 2.50 | 2.50 | 2.50 | 2.50 | 2.50 |
| ITX | 1.00 | 1.00 | 1.02 | 1.00 | 1.00 | 1.00 | 1.00 | 1.00 | 1.00 | 1.00 |
| BYK 377 | 2 | 2 | 1.02 | 1.00 | 0.50 | 0.25 | | | | |
| V-Cap | 2.00 | 2.00 | 1.02 | 2.00 | 2.50 | 2.75 | 2.00 | 2.00 | 2.00 | 2.00 |
| Cyan Dispersion in tripropylene glycol methyl ether monocrylate | 11.00 | 11.00 | | | | | | | | |
| Cyan Dispersion in 2-Phenoxy ethyl acrylate | 000 | 000 | 13.28 | 13.00 | 13.00 | 13.00 | 15.00 | 15.00 | 13.00 | 13.00 |
| | | | 000 | 000 | 000 | 000 | 000 | 000 | 000 | 000 |
| Total | 100.00 | 100.00 | 100.00 | 100.00 | 100.00 | 100.00 | 100.00 | 100.00 | 100.00 | 100.00 |

Table 23 provides the viscosity, % elongation, adhesion and MEK rubs and demonstrates that these cyan inks, formulated with 2-phenoxy ethyl acrylate, provide tack free cure. These inks also show elongation as high as 290% (11C) as determined via Instron. At such high % elongation the substrate tends to snap before the ink separation can occur. The presence of silicone acrylate, along with a small amount of a non-reactive plasticizer, namely propylene carbonate, contribute to the cured ink's high elongation. The presence of the non-reactive plasticizer also lowers the viscosity which is typically between 23 to 35 cps at 25° C., and is in the ideal range for a jettable fluid. Also, the surfactant provided slip characteristics. The cured inks, especially 11C, showed excellent ink coverage upon thermoforming over a PVC substrate with minimal cracking. The ink also adhered well to vinyl.

TABLE 23

| Properties | 11A | 11B | 11C | 11D | 11E | 11F | 11G | 11H | 11I | 11J |
|---|---|---|---|---|---|---|---|---|---|---|
| Viscosity @ 25° C. | N/A | N/A | 35.9 | 31.5 | 28.1 | 31.3 | 33.4 | 22.9 | 22.6 | 39.1 |
| Initial Cure (thumb test) | cured no tack | some tack | cured no tack | cured no tack | cured no tack | cured no tack | cured no tack | cured no tack | cured no tack | cured no tack |
| Elongation | 281 | 277 | 290 | 234 | 230 | 235 | 235 | 270 | 245 | 217 |
| Adhesion over Vinyl | N/A | N/A | 5B | 0B | 0B | 1B | 5B | 5B | 5B | 5B |
| MEK rubs over vinyl | N/A | N/A | 1 | 0 | 0 | 0 | 0 | 0 | 0 | 0 |
| Comments upon thermoforming | N/A | N/A | no cracks | no cracks | no cracks | some cracks | no cracks | no cracks | no cracks | no cracks |

Example 12

This Example 12 demonstrates elongatable ink compositions formulated using a purified version of CD420 which is known to contain unreacted alcohol. PRO-10180 is a purified version of CD420, both available from Sartomer, and used to demonstrate effect on cure, elongation and other physical properties, of the cured ink. These inks were also formulated with monofunctional acrylate cyan pigment dispersion derived from 2-phenoxy ethyl acrylate. The over all level of monofunctional acrylate monomer is below about 64%. The complete formulations are set forth in Table 24.

The inks are cured using a standard mercury lamp at a dose of 700 mJ/cm². Typically drawdowns are made using a K-proofer with a 12 micron rod over a plasticized vinyl. The cured drawdowns are conditioned overnight at 50% relative humidity and % elongation is measured via Instron, until ink separation or fading occurs or the vinyl snaps. Also, using a 6 Meyer rod, drawdowns are made over PVC substrate. These substrates containing the cured ink are then thermoformed at or above the Tg of the substrate. A failure occurs if ink cracks within the crevasses of the thermoformed structure. Table 25 provides information on % elongation, adhesion, MEK rubs and cure. Based on the results shown below, the cyan inks formulated with PRO-10180 and 2-phenoxy ethyl acrylate based dispersions provide tack free cure. These inks also show high % elongation (as high as 270%) determined via Instron. Even at such high % elongation, the substrate tends to snap before ink separation can occur. Compositions 12H and 12I exhibit a particularly good combination of properties.

TABLE 24

| Component | 12A | 12B | 12C | 12D | 12E | 12F | 12G | 12H | 12I | 12J | 12K |
|---|---|---|---|---|---|---|---|---|---|---|---|
| CN966H90 | 6.60 | 4.60 | 2.60 | 1.00 | | | | | | | |
| CN966J75 | | | | | | 5.10 | 5.00 | 5.00 | 5.00 | 5.00 | 5.00 |
| CN996 | 6.00 | 8.00 | 10.00 | 11.60 | 12.00 | 5.10 | | | | | |
| PRO-10180 | 49.60 | 49.60 | 49.60 | 49.60 | 49.50 | 50.00 | 49.00 | 49.00 | 49.00 | 49.00 | 49.00 |
| CN 3100 | | | | | | | 6 | 6 | | | |
| CN 131 | | | | | | | | | 6 | 6 | |
| Genomer 1122 | | | | | | | | | | | 6 |
| EB 1360 | 8.00 | 8.00 | 8.00 | 8.00 | | 8.16 | 8.00 | 8.00 | 8.00 | 8.00 | 8.00 |
| Propylene Carbonate | | | | | | 2.04 | 2 | 3 | 2 | 3 | 3 |
| EB 350 | | | | | 6.00 | | | | | | |
| Darocure EHA | 2.00 | 2.00 | 2.00 | 2.00 | 2.00 | 2.04 | 2.00 | 2.00 | 2.00 | 2.00 | 2.00 |
| I-819 | 1.70 | 1.70 | 1.70 | 1.70 | 1.70 | 1.73 | 1.70 | 1.70 | 1.70 | 1.70 | 1.70 |
| TPO-L | 3.50 | 3.50 | 3.50 | 3.50 | 3.50 | 3.57 | 3.50 | 3.50 | 3.50 | 3.50 | 3.50 |
| Genocure LBP | 2.00 | 2.00 | 2.00 | 2.00 | 2.00 | 2.04 | 2.00 | 2.00 | 2.00 | 2.00 | 2.00 |
| Darocur 1173 | 2.10 | 2.10 | 2.10 | 2.10 | 0.80 | 1.33 | 1.30 | 1.30 | 1.30 | 1.30 | 1.30 |
| Irgacure 369 | 2.50 | 2.50 | 2.50 | 2.50 | 2.50 | 2.55 | 2.50 | 2.50 | 2.50 | 2.50 | 2.50 |
| ITX | 1.00 | 1.00 | 1.00 | 1.00 | 1.00 | 1.02 | 1.00 | 1.00 | 1.00 | 1.00 | 1.00 |
| BYK 377 | 2 | 2 | 2 | 2 | 4.00 | 1.02 | 1.00 | | 0.20 | | |
| V-Cap | 2.00 | 2.00 | 2.00 | 2.00 | 4.00 | 1.02 | 2 | 2 | 2.80 | 2.00 | 2.00 |
| Cyan Dispersion in 2-phenoxy ethyl acrylate | 11.00 | 11.00 | 11.00 | 11.00 | 11.00 | 13.28 | 13.00 | 13.00 | 13.00 | 13.00 | 13.00 |
| Total | 100.00 | 100.00 | 100.00 | 100.00 | 100.00 | 100.00 | 100.00 | 100.00 | 100.00 | 100.00 | 100.00 |

TABLE 25

| Properties | Properties | | | | | | | | | | |
|---|---|---|---|---|---|---|---|---|---|---|---|
| | 12A | 12B | 12C | 12D | 12E | 12F | 12G | 12H | 12I | 12J | 12K |
| Initial Cure (i.e. are the fims tacky, thumb test) | Cured | Cured | Cured | Cured | Cured | Cured | Cured | Cured | Cured | Cured | Slight Tack at the surface |
| Does the ink transfer over the paper | No transfer | No transfer | No transfer | No transfer | No transfer | No transfer | No transfer | No transfer | No transfer | No transfer | Some transfer |
| % Elongation | 270 | 256 | 248 | 243 | 264 | 271 | 264 | 247 | 260 | 258 | 253 |
| Observation on Elongation at 200%, over slide | No separation | No separation | No separation | No separation | No separation | No separation | No separation | No separation | No separation | No separation | No separation |
| Adhesion over Vinyl | 5B | 5B | 5B | 1B | 2B | 5B | 5B | 5B | 5B | 5B | 5B |
| MEK rubs over vinyl | 2 | 9 | 2 | 1 | 3 | 5 | 1 | 2 | 3 | 2 | 0 |
| Comments during elongation | The substrate snapped | The substrate snapped | The substrate snapped | The substrate snapped | The substrate snapped | The substrate snapped | The substrate snapped | The substrate snapped | The substrate snapped | The substrate snapped | The substrate snapped |
| Comments upon thermoforming | Ink cracks, little fading | Ink cracks, little fading | Ink cracks, little fading | Ink cracks, little fading | Ink cracks, little fading | Ink cracks, little fading | Ink cracks | Minimal cracks | Minimal cracks | Minimal cracks | No cracks, tacky surface, little ink fading |

Example 13

This Example 13 demonstrates ink compositions including reactive plastizers, such as Neodene 16, which contribute during the thermoforming process to provide excellent ink coverage over a formed structure. Blends of monofunctional acrylate monomers are employed (CD420, SR506, SR339, CD27, Laromer TBCH, SR614, Genomer 1122, SR489D, CD277, CD585) to reduce surface tackiness. The complete formulations are set forth in Table 26.

Table 27 provides properties of the cured inks. The monotunctional monomer mixtures of CD 420 and SR506 (isobornyl acrylate) or Laromer TBCH (4-tert-butylcyclohexyl acrylate) show particularly good surface characteristics. Also upon thermoforming, the inks exhibit excellent coverage over a formed structure with no significant ink cracking or fading. The viscosities of most of these inks are in the low 30's cPs and the inks also exhibit excellent adhesion over a vinyl substrate.

TABLE 26

| Ink Compositions | | | | | | | | | |
|---|---|---|---|---|---|---|---|---|---|
| Component | 13A | 13B | 13C | 13D | 13E | 13F | 13G | 13H | 13I |
| CN966J75 | 8.00 | 8.00 | 8.00 | 8.00 | 8.00 | 8.00 | 8.00 | 8.00 | 8.00 |
| CN131 | 13.00 | 13.00 | 13.00 | 13.00 | 13.00 | 13.00 | 13.00 | 13.00 | 13.00 |
| CD420 | 28.00 | 28.00 | 28.00 | 28.00 | 28.00 | 28.00 | 28.00 | 28.00 | 28.00 |
| Darocur EHA | 2.00 | 2.00 | 2.00 | 2.00 | 2.00 | 2.00 | 2.00 | 2.00 | 2.00 |
| MBF | 1.30 | 1.30 | 1.30 | 1.30 | 1.30 | 1.30 | 1.30 | 1.30 | 1.30 |
| Genocure LBP | 2.00 | 2.00 | 2.00 | 2.00 | 2.00 | 2.00 | 2.00 | 2.00 | 2.00 |
| Irgacure 819 | 1.70 | 1.70 | 1.70 | 1.70 | 1.70 | 1.70 | 1.70 | 1.70 | 1.70 |
| Irgacure 369 | 2.50 | 2.50 | 2.50 | 2.50 | 2.50 | 2.50 | 2.50 | 2.50 | 2.50 |
| TPO-L | 3.50 | 3.50 | 3.50 | 3.50 | 3.50 | 3.50 | 3.50 | 3.50 | 3.50 |
| ITX | 1.00 | 1.00 | 1.00 | 1.00 | 1.00 | 1.00 | 1.00 | 1.00 | 1.00 |
| Neodene 16 | 2.00 | 2.00 | 2.00 | 2.00 | 2.00 | 2.00 | 2.00 | 2.00 | 2.00 |
| SR506 | 20.00 | | | | | | | | |
| SR339 | | 20.00 | | | | | | | |
| CD278 | | | 20.00 | | | | | | |
| Laromer TBCH | | | | 20.00 | | | | | |
| SR614 | | | | | 20.0 | | | | |
| Genomer 1122 | | | | | | 20.00 | | | |
| SR489D | | | | | | | 20.00 | | |
| CD277 | | | | | | | | 20.00 | |
| CD585 | | | | | | | | | 20.00 |
| V-Cap | 2.00 | 2.00 | 2.00 | 2.00 | 2.00 | 2.00 | 2.00 | 2.00 | 2.00 |
| Cyan Dispersion in 2-PEA | 13.00 | 13.00 | 13.00 | 13.00 | 13.00 | 13.00 | 13.00 | 13.00 | 13.00 |
| Total | 100.00 | 100.00 | 100.00 | 100.00 | 100.00 | 100.00 | 100.00 | 100.00 | 100.00 |

TABLE 27

| Properties | 13A | 13B | 13C | 13D | 13E | 13F | 13G | 13H | 13I |
|---|---|---|---|---|---|---|---|---|---|
| Viscosity (cps) 25° C. | 32.63 | 34.42 | 24.74 | 33.15 | 55.56 | 43.96 | 25.90 | 27.58 | 30.96 |
| Comments upon thermoforming | no cracks | minor cracks | minor cracks | no cracks | minor cracks | minor cracks | N/A | N/A | N/A |
| Initial Cure Notes | Cured | Cured | Tacky | Cured | Cured | Cured | Tacky | Tacky | Tacky |
| Cross Hatch Adhesion | 5B | 5B | 5B | 5B | 5B | 5B | 5B | 5B | 5B |
| MEK Double Rubs | 0 | 0 | 0 | 0 | 0 | 0 | 0 | 0 | 0 |
| % Elongation | 236.7 | 231.1 | N/A | 228.8 | 221.2 | 233.2 | N/A | N/A | N/A |

Example 14

This Example 14 demonstrates cyan inks based on a polyester oligomer (R-Gen RD-276) and a hydroxy functional low viscosity oligomer (CN 131). The formulations contain non-reactive as well as reactive plasticizers. The cyan pigment dispersion is based on 2-phenoxy ethyl acrylate monomer. The complete formulations are set forth in Table 28.

TABLE 28

Ink Compositions

| Component | 14A | 14B | 14C | 14D | 14E |
|---|---|---|---|---|---|
| CD420 | 48.00 | 48.00 | 48.00 | 48.00 | 48.00 |
| Darocur EHA | 2.00 | 2.00 | 2.00 | 2.00 | 2.00 |
| MBF | 1.30 | 1.30 | 1.30 | 1.30 | 1.30 |
| Genocure LBP | 2.00 | 2.00 | 2.00 | 2.00 | 2.00 |
| Irgacure 819 | 1.70 | 1.70 | 1.70 | 1.70 | 1.70 |
| Irgacure 369 | 2.50 | 2.50 | 2.50 | 2.50 | 2.50 |
| TPO-L | 3.50 | 3.50 | 3.50 | 3.50 | 3.50 |
| ITX | 1.00 | 1.00 | 1.00 | 1.00 | 1.00 |
| Neodene 16 | 2.00 | 2.00 | 2.00 | 2.00 | |
| Propylene Carbonate | | | | | 2.00 |
| CN131 | 13.00 | 9.00 | 5.00 | | 13.00 |
| R-Gen RD-276 | 8.00 | 12.00 | 16.00 | 21.00 | 8.00 |
| V-Cap | 2.00 | 2.00 | 2.00 | 2.00 | 2.00 |
| Cyan Dispersion in 2-phenoxy ethyl acrylate | 13.00 | 13.00 | 13.00 | 13.00 | 13.00 |
| Total | 100.00 | 100.00 | 100.00 | 100.00 | 100.00 |

Table 29 provides properties of the cured inks. The inks derived from the polyester oligomer provide low viscosity ink formulations between 18 to 25 cPs. The cured inks thermoformed over PVC show excellent ink coverage over the structure with no cracking. The ink surface shows no tack and the % elongation over the plasticized vinyl is between 230 to 265%. The substrates containing the cured ink snap before ink separation occurs.

TABLE 29

| Properties | 14A | 14B | 14C | 14D | 14E |
|---|---|---|---|---|---|
| Viscosity (cps) at 25° C. | 19.00 | 20.26 | 21.1 | 25.26 | 18.20 |
| Comments upon thermoforming | No cracks | minimal cracks | minimal cracks | minimal cracks | N/A |
| Initial Cure | Cure no tack | Cure no tack | Cure no tack | Cure no tack | Cure no tack |
| Cross Hatch Adhesion | 0B | 0B | 0B | 0B | 0B |
| MEK Double Rubs | 0 | 0 | 0 | 0 | 0 |
| % Elongation | 255.6 | 245.8 | 237.6 | 239.0 | 264.1 |

Example 15

This Example 15 demonstrates ink compositions based on a mixture of monofunctional monomers along with fast reacting vinyl amide as in examples 15A, 15C, 15E and 15G. These compositions also contain a low viscosity reactive plasticizer as well as a low viscosity aromatic monacrylate oligomer, CN 131, or a purified version thereof, CN 131B, both versions commercially available from Sartomer. Examples 15B, 15D, 15F and 15H are optimized formulas, without vinyl amide or reactive plasticizer. Both types of these ink sets are based upon dispersions derived from the mono functional monomer. The complete formulations are set forth in Table 30.

TABLE 30

Ink Compositions

| Raw Material | 15A Cyan-1 | 15B Cyan-2 | 15C Magenta-1 | 15D Magenta-2 | 15E Yellow-1 | 15F Yellow-2 | 15G Black-1 | 15H Black-2 |
|---|---|---|---|---|---|---|---|---|
| CN966J75 | 4.000 | 2.000 | 4.000 | 2.000 | 4.000 | 2.000 | 4.000 | 2.000 |
| CD420 | 28.000 | 2.000 | 28.000 | 2.000 | 28.000 | 2.000 | 28.000 | 2.000 |
| SR506 | 20.000 | 50.000 | 20.000 | 50.000 | 20.000 | 50.000 | 20.000 | 50.000 |
| CN131 | 13.000 | | 13.000 | | 13.000 | | 13.000 | |
| CN131 B | | 15.000 | | 15.000 | | 15.000 | | 15.000 |
| EB1360 | 4.000 | 4.000 | 4.000 | 4.000 | 4.000 | 4.000 | 4.000 | 4.000 |
| Neodene 16 | 2.000 | | 2.000 | | 2.000 | | 2.000 | |
| Genocure EHA | 2.000 | 2.000 | 2.000 | 2.000 | 2.000 | 2.000 | 2.000 | 2.000 |
| Genocure MBF | 1.300 | 1.300 | 1.300 | 1.300 | 1.300 | 1.300 | 1.300 | 1.300 |
| Irgacure 819 | 1.700 | 1.700 | 1.700 | 1.700 | 1.700 | 1.700 | 1.700 | 1.700 |

TABLE 30-continued

Ink Compositions

| Raw Material | 15A Cyan-1 | 15B Cyan-2 | 15C Magenta-1 | 15D Magenta-2 | 15E Yellow-1 | 15F Yellow-2 | 15G Black-1 | 15H Black-2 |
|---|---|---|---|---|---|---|---|---|
| TPO-L | 3.500 | 3.500 | 3.500 | 3.500 | 3.500 | 3.500 | 3.500 | 3.500 |
| Genocure LBP | 2.000 | 2.000 | 2.000 | 2.000 | 2.000 | 2.000 | 2.000 | 2.000 |
| Irgacure 369 | 2.500 | | 2.500 | | 2.500 | | 2.500 | |
| Irgacure 379 | | 2.500 | | 2.500 | | 2.500 | | 2.500 |
| ITX | 1.000 | 1.000 | 1.000 | 1.000 | 1.000 | 1.000 | 1.000 | 1.000 |
| V-cap | 2.000 | | 2.000 | | 2.000 | | 2.000 | |
| Cyan Dispersion, 20% in 2-PEA | 13.000 | 13.000 | | | | | | |
| Magenta Dispersion, 17-20% in 2-PEA | | | 13.000 | 13.000 | | | | |
| Yellow Dispersion, 20% in 2-PEA | | | | | 13.000 | 13.000 | | |
| Black Dispersion, 20% in 2-PEA | | | | | | | 13.000 | 13.000 |
| Total | 100.000 | 100.000 | 100.000 | 100.000 | 100.000 | 100.000 | 100.000 | 100.000 |

Table 31 provides properties of the liquid and cured inks. All inks possessed viscosities below 30 cps at 25° C. The cured ink, over flexible vinyl, elongated to greater than 200%, where substrate failure occurred before the ink failure. The cured inks, thermoformed over PVC, showed excellent ink coverage with no cracking. The inks were cured using a standard mercury vapor lamp at 700 mJ/cm2, and exhibited a tack free surface.

TABLE 31

Properties

| Properties | 15A Cyan-1 | 15B Cyan-2 | 15C Magenta-1 | 15D Magenta-2 | 15E Yellow-1 | 15F Yellow-2 | 15G Black-1 | 15H Black-2 |
|---|---|---|---|---|---|---|---|---|
| Viscosity @ 25° C. | 28.0 | 29.3 | 22.8 | 28.9 | 23.3 | 27.6 | 25.9 | 28.3 |
| Initial Cure (i.e. are the films tacky, thumb test), 700 mJ/cm2, H, Hg Vapor Bulb | Cured | Cured | Cured | Cured | Cured | Cured | Cured | Cured |
| % Elongation at room temperature | 237 | 262 | 217 | 231 | 220 | 218 | 251 | 262 |
| Adhesion over Vinyl | 5B | 5B | 5B | 5B | 5B | 5B | 5B | 5B |
| MEK rubs over Vinyl | 0 | 0 | 0 | 0 | 0 | 0 | 0 | 0 |
| Adhesion over PVC | 5B | 5B | 5B | 5B | 5B | 5B | 5B | 5B |
| MEK rubs over PVC | 0 | 0 | 0 | 0 | 0 | 0 | 0 | 0 |
| Adhesion over PET | 5B | 5B | 5B | 5B | 5B | 5B | 5B | 5B |
| MEK rubs over PET | 0 | 0 | 0 | 0 | 0 | 0 | 0 | 0 |
| Adhesion over PC | 5B | 5B | 5B | 5B | 5B | 5B | 5B | 5B |
| MEK rubs over PC | 0 | 0 | 0 | 0 | 0 | 0 | 0 | 0 |
| Comments upon thermoforming | No Cracking | No Cracking | No Cracking | No Cracking | No Cracking | No Cracking | No Cracking | No Cracking |
| FTIR % Cure Top on PET @ 700 mJ/cm2, # 6 Meyer rod, Hg Vapor bulb | No peak | No peak | No peak | No peak | No peak | No peak | No peak | No peak |
| FTIR % Cure Bottom on PET @ 700 mJ/cm2, # 6 Meyer rod, Hg Vapor bulb | No peak | No peak | No peak | No peak | No peak | No peak | No peak | No peak |
| Dynamic Surface Tension (mN/m) at 1000 msecs | 25.7 | 25.7 | 25.4 | 25.4 | 26.1 | 25.5 | 26.1 | 25.2 |

Example 16

This Example 16 demonstrates ink compositions based on a mixture of monofunctional monomers along with fast reacting vinyl amide. Examples 16A, 16C, 16E and 16G contain the purified version of low viscosity oligomer CN 131B. Formulas 16B, 16D, 16F, 16H and 16I are derived from the low viscosity oligomer CN 3100. These compositions exhibit cure at low dose, typically at 100 mJ/cm2, under a standard mercury vapor lamp. The presence of CN 386 provides excellent surface cure at low dose. Inks based on 16I also provides excellent surface cure at 100 mJ/cm2. The complete formulations are set forth in Table 32.

TABLE 32

Ink Compositions

| Raw Material | 16A Cyan-3 | 16B Cyan-4 | 16C Magenta-3 | 16D Magenta-4 | 16E Yellow-3 | 16F Yellow-4 | 16G Black-3 | 16H Black-4 | 16I Black-5 |
|---|---|---|---|---|---|---|---|---|---|
| CN966J75 | 2.750 | 2.200 | 2.750 | 2.200 | 2.750 | 2.200 | 2.750 | 2.400 | 2.000 |
| SR506 | 39.500 | 39.500 | 39.500 | 39.500 | 39.500 | 39.500 | 39.500 | 39.500 | 41.000 |
| V-Pyrol | 11.000 | 11.000 | 11.000 | 11.000 | 11.000 | 11.000 | 11.000 | 11.000 | 11.000 |
| CN131 B | 18.500 | | 18.500 | | 18.500 | | 18.500 | | |
| CN 3100 | | 18.200 | | 18.200 | | 18.200 | | 19.050 | 19.450 |
| EB1360 | 0.750 | 0.750 | 0.750 | 0.750 | 0.750 | 0.750 | 0.750 | 0.750 | 0.750 |
| CN 386 | 4.000 | 4.000 | 4.000 | 4.000 | 4.000 | 4.000 | 4.000 | 4.000 | |
| Irgacure 819 | 1.500 | 1.500 | 1.500 | 1.500 | 1.500 | 1.500 | 1.500 | | |
| Irganox 1035 | | 0.500 | | 0.500 | | 0.500 | | 0.500 | 0.500 |
| G-01402 | | 0.350 | | 0.350 | | 0.350 | | | |
| MEHQ | | | | | | | | 0.150 | 0.150 |
| D 1173 | | | | | | | | | 2.500 |
| TPO-L | 3.500 | 3.500 | 3.500 | 3.500 | 3.500 | 3.500 | 3.500 | | |
| Darocure TPO | | | | | | | | 1.500 | 1.500 |
| Genocure LBP | 2.000 | 2.000 | 2.000 | 2.000 | 2.000 | 2.000 | 2.000 | | |
| Irgacure 379 | 2.500 | 2.500 | 2.500 | 2.500 | 2.500 | 2.500 | 2.500 | 6.150 | 6.150 |
| ITX | 1.000 | 1.000 | 1.000 | 1.000 | 1.000 | 1.000 | 1.000 | 2.000 | 2.000 |
| Cyan Dispersion, 20% in 2-PEA | 13.000 | 13.000 | | | | | | | |
| Magenta Dispersion, 17-20% in 2-PEA | | | 13.000 | 13.000 | | | | | |
| Yellow Dispersion, 20% in 2-PEA | | | | | 13.000 | 13.000 | | | |
| Black Dispersion, 20% in 2-PEA | | | | | | | 13.000 | 13.000 | 13.000 |
| Total | 100.000 | 100.000 | 100.000 | 100.000 | 100.000 | 100.000 | 100.000 | 100.000 | 100.000 |

Table 33 provides properties of the liquid and cured inks. All inks possessed viscosities below 30 cps at 25° C. The cured ink, over flexible vinyl, elongated to greater than 200% where substrate failure occurred before the ink failure. Compositions 16B, 16D, 16F, 16H and 16I were pulled at 50° C. The cured inks at 50° C. elongated greater than or about 300%, upon which the elongation test had to be discontinued. The cured inks thermoformed over the PVC show excellent ink coverage over the substrate with no cracking. The inks were cured using a standard mercury vapor lamp at 100 mJ/cm2, and exhibited a tack free surface.

TABLE 33

Properties

| Properties | 16A Cyan-3 | 16B Cyan-4 | 16C Magenta-3 | 16D Magenta-4 | 16E Yellow-3 | 16F Yellow-4 | 16G Black-3 | 16H Black-4 | 16I Black-5 |
|---|---|---|---|---|---|---|---|---|---|
| Viscosity @ 25° C. | 27.3 | 29.8 | 25.5 | 26.0 | 26.2 | 25.3 | 25.9 | 27.8 | 27.1 |
| Initial Cure (i.e. are the fims tacky, thumb test), 700 mJ/cm2, H, Hg Vapor Bulb | Cured | Cured | Cured | Cured | Cured | Cured | Cured | Cured | Cured |
| % Elongation at room temperature | 209 | | 209 | | 270 | | 238 | | |
| % Elongation at 50 C. | | 364 | | 354 | | 378 | | 292 | 393 |
| Adhesion over Vinyl | 5B | 5B | 5B | 5B | 5B | 5B | 5B | 5B | 5B |
| MEK rubs over Vinyl | 0 | 0 | 0 | 0 | 0 | 0 | 0 | 0 | 0 |
| Adhesion over PVC | 5B | 5B | 5B | 5B | 5B | 5B | 5B | 5B | 5B |
| MEK rubs over PVC | 0 | 0 | 0 | 0 | 0 | 0 | 0 | 0 | 0 |

TABLE 33-continued

| | Properties | | | | | | | | |
|---|---|---|---|---|---|---|---|---|---|
| Properties | 16A Cyan-3 | 16B Cyan-4 | 16C Magenta-3 | 16D Magenta-4 | 16E Yellow-3 | 16F Yellow-4 | 16G Black-3 | 16H Black-4 | 16I Black-5 |
| Adhesion over PET | 5B | 5B | 5B | 5B | 5B | 5B | 4B | 5B | 5B |
| MEK rubs over PET | 0 | 0 | 0 | 0 | 0 | 0 | 0 | 0 | 0 |
| Adhesion over PC | 5B | 0B | 5B | 5B | 5B | 5B | 0B | 0B | 0B |
| MEK rubs over PC | 0 | 0 | 0 | 0 | 0 | 0 | 0 | 0 | 0 |
| Comments upon thermoforming | No Cracking | No Cracking | No Cracking | No Cracking | No Cracking | No Cracking | No Cracking | No Cracking | No Cracking |
| FTIR % Cure Top on PET @ 100 mJ/cm2, # 6 Meyer rod, Hg Vapor bulb | No peak | No peak | No peak | No peak | No peak | No peak | No peak | No peak | 99.5% |
| FTIR % Cure Bottom on PET @ 100 mJ/cm2, # 6 Meyer rod, Hg Vapor bulb | No peak | No peak | No peak | No peak | No peak | No peak | No peak | No peak | No peak |
| Dynamic Surface Tension (mN/m) at 1000 msecs | 26.3 | | 26.5 | | 26.3 | | 26.0 | 25.2 | |

Example 17

This Example 17 demonstrates white ink compositions based on a mixture of monofunctional monomers and vinyl amide. Example 17A contains a purified low viscosity oligomer CN 131B whereas Example 17B contains CN 3100. In both examples, CN 386 an amine synergist along with photoinitiator LBP, were used to provide excellent surface cure. Both types of inks are based on the dispersions derived from the mono functional monomer. The complete formulations are set forth in Table 34.

TABLE 34

| | Ink Compositions | |
|---|---|---|
| Raw Material | 17A White-1 | 17b White-2 |
| CN966J75 | 2.000 | 2.000 |
| SR506 | 32.250 | 29.150 |
| CD 420 | 1.500 | |
| V-Pyrol | 10.000 | 11.000 |
| CN 131B | 8.000 | |
| CN 3100 | | 14.000 |
| EB1360 | 4.000 | 1.000 |
| CN 386 | 6.000 | 6.000 |
| Irgacure 819 | 2.000 | 2.000 |
| Irganox 1035 | | 0.500 |
| MEHQ | | 0.150 |
| TPO-L | 1.750 | 1.700 |
| Genocure LBP | 1.500 | 1.500 |
| Chivacure BMS | 1.000 | 1.000 |
| White Dispersion, 50% in 2-PEA | 30.000 | 30.000 |
| Total | 100.000 | 100.000 |

Table 35 provides properties of the liquid and cured inks. Both inks provide viscosities below 25 cps at 25° C. The cured ink over flexible vinyl elongated to greater than 200% where substrate failure occurred before the ink failure. The cured inks thermoformed over the PVC and showed excellent white ink coverage with no cracking. The inks cured using a standard mercury vapor lamp at 700 mJ/cm2, exhibited a tack free surface.

TABLE 35

| | Properties | |
|---|---|---|
| Properties | 17A White-1 | 17B White-2 |
| Viscosity @ 25° C. | 23.6 | 21.3 |
| Initial Cure 700 mJ/cm2, H, Hg Vapor Bulb (i.e. are the fims tacky, thumb test) | Cured | Cured |
| % Elongation | 240 | 265 |
| Adhesion over Vinyl | 5B | 5B |
| MEK rubs over Vinyl | 0 | 0 |
| Adhesion over PVC | 5B | 5B |
| MEK rubs over PVC | 0 | 0 |
| Adhesion over PET | 5B | 5B |
| MEK rubs over PET | 0 | 0 |
| Adhesion over PC | 2B | 5B |
| MEK rubs over PC | 0 | 0 |
| Comments upon thermoforming | No Cracking | No Cracking |
| FTIR % Cure Top on PET @ 200 mJ/cm2, # 6 Meyer rod, Hg Vapor bulb | No peak | No peak |
| FTIR % Cure Bottom on PET @ 200 mJ/cm2, # 6 Meyer rod, Hg Vapor bulb | No peak | No peak |
| Dynamic Surface Tension (mN/m) at 1000 msecs | 23.9 | 25.3 |

Comparative Example 18

This Example 18 demonstrates compositions prepared in accordance with US 2006/0275588. Acrylic solutions were prepared by adding resin MB-2594 or MB-2823, both commercially available from Dianal America, Inc., to a mixture of SR 339, containing V-cap or V-Pyrol, and stabilizer such as First Cure ST-1, commercially available from Albemarle Corporation. G-01402 is similar in composition to G-16, both commercially available from Rahn. Comparative example 18A took more than 20 hours, and comparative examples 18B and 18C took about 4 hours, in a 45° C. oven to obtain a homogeneous solution. Similarly, homogenous initiator solution were prepared by dissolving several photoinitiators into the monomer SR 506, upon warming in a 45° C. oven for one hour. 40% of the acrylic solution and 35% of the initiator solution were added to a mixture of CN 131, Ebceryl 381 and Black dispersion. The ink was obtained upon shaking for 15 minutes at room temperature.

TABLE 36

Comparative Ink Compositions

| Type | Raw Material | Supplier | Comp. 18A | Comp. 18B | Comp. 18C |
|---|---|---|---|---|---|
| Acrylic | SR 339 | Sartomer | 17.4 | 16.8 | 16.6 |
| Solution | V-CAP | ISP | 15 | 14.8 | |
| | V-pyrol | BASF | | | 14.8 |
| | First Cure ST-1 Polymerization Inhibitor | Albemarle | 0.6 | 0.4 | |
| | G-01402 | Rahn | | | 0.6 |
| | MB-2594 | Dianal | | 8 | |
| | MB-2823 | Dianal | 7 | | 8 |
| Initiator | SR 506 | Sartomer | 21.96 | 21.96 | 21.96 |
| Solution | First Cure ST-1 Polymerization Inhibitor | Albemarle | 0.24 | 0.24 | 0.24 |
| | ITX | Ciba | 3 | 3 | 3 |
| | I-369 | Ciba | 2.1 | 2.1 | 2.1 |
| | Benzyl Dimethylketal | Ciba | 3.5 | 3.5 | 3.5 |
| | Ethyl-4 (Dimethylamino) benzoate | Ciba | 4.2 | 4.2 | 4.2 |
| | CN 131 | Sartomer | 10 | 10 | 10 |
| | RJA Black Dispersion in 2-PEA D3010K | RJA | 14 | 14 | 14 |
| | Ebceryl 381 | Cytec | 1 | 1 | 1 |
| | Total | | 100.00 | 100.00 | 100.00 |

Liquid and cured ink properties are provided in Table 37 below. Only example 18B provided viscosity of 32.8 cps at 25° C. when measured with a Haake Rheometer. The inks were wet at 100 mJ/cm$^2$ when cured with a Fusion H lamp. Although the cured ink in example 18B exhibited over 90% conversion for the top surface, the ink film appeared to be tacky, at an energy density of 250 mJ/cm$^2$. The cured ink at 700 mJ/cm$^2$ over the vinyl exhibited excellent elongation with the substrate failure occurring before the ink failure, when elongated at 25° C. Over 300% elongation occurred at 50° C., at which stage the elongation test was stopped.

TABLE 37

Properties

| Testing | Comp. 18A | Comp. 18B | Comp. 18C |
|---|---|---|---|
| Ink Viscosity at 25° C., Haake, 500 sec$^{-1}$ | 56.4 | 32.8 | 50.3 |
| Appearance, PET, Fusion, H, 100 mJ/cm$^2$ | Not Cured | Not Cured | Not Cured |
| FTIR, 1410 cm$^{-1}$, PET, Fusion, H, 100 mJ/cm$^2$ | NA | NA | NA |
| Appearance on PET, Fusion, H, 250 mJ/cm$^2$ | Tacky | Tacky | Tacky |
| FTIR, 1410 cm$^{-1}$, PET, Fusion, H, 250 mJ/cm$^2$ | No peak | 93.30% | 94.40% |
| % Elongation at 25° C. over flexible vinyl | 215.02 | 180.68 | 169.4 |
| Failure upon elongation at 25° C. | Substrate Snapped | Substrate Snapped | Substrate Snapped |
| % Elongation at 50° C. over flexible vinyl | 364.48 | 348.92 | 347.46 |
| Failure upon elongation at 50° C. | Test stopped | Test stopped | Test stopped |
| Crosshatch Adhesion over PC, 700 mJ/cm$^2$, H, Fusion | 0B | 0B | 5B |
| Crosshatch Adhesion over PVC, 700 mJ/cm$^2$, H, Fusion | 4B | 5B | 5B |
| Crosshatch Adhesion over PET, 700 mJ/cm$^2$, H, Fusion | 3B | 0B | 2B |
| Crosshatch Adhesion over Flexible Vinyl, 700 mJ/cm$^2$, H, Fusion | 0B | 0B | 4B |

Example 19

This Example 19, further demonstrates formulas of the invention which are free of non-reactive oligomers and are derived from 100% UV radiation curable materials thereby providing formulations that are much easier to prepare resulting in reduced processing time and costs.

TABLE 38

Ink Compositions

| Raw Material | Supplier | 19A | 19B | 16H | 16G |
|---|---|---|---|---|---|
| SR 506 | Sartomer | 41 | 41 | 39.5 | 39.5 |
| V-Pyrol | BASF | 11 | 11 | 11 | 11 |
| CN 966J75 | Sartomer | 2 | 2 | 2.4 | 2.75 |
| CN 131B | Sartomer | | | | 18.5 |
| CN 3100 | Sartomer | 19.45 | 19.45 | 19.05 | |
| I-1035 | Ciba | 0.5 | 0.5 | 0.5 | |
| MEHQ | Aldrich | 0.15 | 0.15 | 0.15 | |
| EB 1360 | Cytec | 0.75 | 0.75 | 0.75 | 0.75 |
| D-1173 | Ciba | 2.5 | | | |
| ITX | Ciba | 2 | 2 | 2 | 1 |
| I-379 | Ciba | 6.15 | 6.15 | 6.15 | 2.5 |
| Darocure TPO | Ciba | 1.5 | 1.5 | 1.5 | |
| I-907 | Ciba | | 2.5 | | |
| CN 386 | Sartomer | | | 4 | 4 |
| I-819 | Ciba | | | | 1.5 |
| Genocure LBP | Rahn | | | | 2 |
| TPO-L | BASF | | | | 3.5 |
| RJA Black Dispersion in 2-PEA D3010K | RJA | 13 | 13 | 13 | 13 |
| Total | | 100 | 100 | 100 | 100 |

Liquid and cured ink properties are provided in Table 39. All examples provided inks with viscosities between 30 to 23 cps at 25° C. when measured with a Haake Rheometer unlike the comparative examples in Table 36. The inks upon cure at 100 mJ/cm$^2$ using a Fusion H lamp exhibited a % double bond conversion above 85% as high as 97.5%. Furthermore, the cured inks did not show any unreacted acrylate unsaturation peak at 1410 cm$^{-1}$, upon curing at 250 mJ/cm$^2$ and the ink exhibited tack free surface unlike the inks in the comparative examples in Table 36. The cured ink at 700 mJ/cm$^2$ over the vinyl exhibited excellent elongation with the substrate failure occurring before the ink failure, when elongated at 25° C. a feature similar to comparative examples in Table 36. Similarly all inks in Table 39 exhibited % elongation at 50° C. of greater than 300%, at which stage the elongation test had to be stopped, a feature similar to comparative inks in example 36.

TABLE 39

| Testing | Ink Properties | | | |
|---|---|---|---|---|
| | 19A | 19B | 16H | 16G |
| Ink Viscosity at 25° C., Haake, 500 sec$^{-1}$ | 26.65 | 23.03 | 30.69 | 27.47 |
| Appearance, PET, Fusion, H, 100 mJ/cm$^2$ | Tacky | Tacky | Tacky | Tacky |
| FTIR, 1410 cm$^{-1}$, PET, Fusion, H, 100 mJ/cm$^2$ | 90.93% | 84.98% | 97.49% | 88.93% |
| Appearance on PET, Fusion, H, 250 mJ/cm$^2$ | Cured | Cured | Cured | Cured |
| FTIR, 1410 cm$^{-1}$, PET, Fusion, H, 250 mJ/cm$^2$ | 100% | 100% | 100% | 100% |
| % Elongation at 25° C. over flexible vinyl | 188.2 | 105.5 | 160.5 | 167.4 |
| Failure upon elongation at 25° C. | Substrate snapped | Substrate snapped | Substrate snapped | Substrate snapped |
| % Elongation at 50 C. over flexible vinyl | 357.66 | 349.06 | 345.96 | 301.92 |
| Failure upon elongation at 50° C. | Test stopped | Test stopped | Test stopped | Snapped |
| Crosshatch Adhesion over PC, 700 mJ/cm$^2$, H, Fusion | 0 | 0 | 0 | 0 |
| Crosshatch Adhesion over PVC, 700 mJ/cm$^2$, H, Fusion | 49 | 49 | 49 | 49 |
| Crosshatch Adhesion over PET, 700 mJ/cm$^2$, H, Fusion | 38 | 41 | 42 | 48 |
| Crosshatch Adhesion over Flexible Vinyl, 700 mJ/cm$^2$, H, Fusion | 48 | 48 | 49 | 49 |

The specific illustrations and embodiments described herein are exemplary only in nature and are not intended to be limiting of the invention defined by the claims. Further embodiments and examples will be apparent to one of ordinary skill in the art in view of this specification and are within the scope of the claimed invention.

We claim:

1. A radiation curable and jettable ink composition, comprising the following components:
   (a) an oligomer containing a mono-ethylenically unsaturated radiation curable functional group;
   (b) an ethylenically unsaturated monofunctional monomer;
   (c) optionally, an oligomer or a monomer each said oligomer or monomer containing ethylenically unsaturated polyfunctional groups; and
   (d) optionally, a chain transfer agent;
wherein components (a) and (c) combined by weight is less than components (b) and (d) combined by weight and further wherein the ink composition is (1) substantially free of solvent, (2) has a viscosity at 25° C. of not greater than about 70 cPs, and (3) when cured by radiation forms an ink having an elongation of at least about 150%.

2. The ink composition of claim 1, having a viscosity at 25° C. of not greater than about 50 cPs.

3. The ink composition of claim 1, comprising from about 5 to about 35 wt % of the mono-ethylenically unsaturated oligomer and any optional oligomer or monomer containing ethylenically unsaturated polyfunctional groups combined, and from about 25 to about 80 wt % of the ethylenically unsaturated monofunctional monomer and any optional chain transfer agent combined.

4. The ink composition of claim 1, wherein the mono-ethylenically unsaturated oligomer comprises an aromatic mono-acrylate.

5. The ink composition of claim 4 further comprises a polyfunctional acrylate oligomer.

6. The ink composition of claim 5, wherein the polyfunctional acrylate oligomer comprises an aliphatic polyester urethane diacrylate oligomer.

7. The ink composition of claim 6 further comprises an additional polyfunctional ethylenically unsaturated oligomer.

8. The ink composition of claim 5 further comprising an amine diacrylate oligomer.

9. The ink composition of claim 5 further comprising a hexafunctional acrylate.

10. The ink composition of claim 9, wherein the hexafunctional acrylate comprises a silicone acrylate.

11. The ink composition of claim 1, wherein the ethylenically unsaturated monofunctional monomer comprises a monofunctional acrylate monomer or a monofunctional acrylate monomer containing a cyclic group, wherein the cyclic group is aliphatic or aromatic and may contain one or more homo or heterocyclic ring structures.

12. The ink composition of claim 11, wherein the monofunctional acrylate monomer comprises isobornyl acrylate.

13. The ink composition of claim 1, the chain transfer agent is present and is selected from an acetoacetate, a thiol, an amine, a mercapto-modified silicone, and combinations thereof.

14. The ink composition of claim 1, wherein the composition is substantially free of non-reactive oligomers.

15. The ink composition of claim 1, wherein the composition is substantially free of non-reactive oligomers having a molecular weight of greater than 10,000 g/mole.

16. The ink composition of claim 1, wherein the composition is free of acrylic polymer or co-polymer having an acid number of below about 20.

17. The radiation curable and jettable ink composition of claim 1 further comprising a colorant.

18. A radiation curable and jettable ink composition for printing onto a substrate which is then thermoformed, said ink composition consisting essentially of the following components:
   (a) from about 5 wt % to about 30 wt % of an oligomer containing a mono-ethylenically unsaturated radiation curable functional group;
   (b) from about 25 wt % to about 80 wt % of an ethylenically unsaturated monofunctional monomer;
   (c) from about 1 wt % to about 15 wt % of an oligomer or a monomer, each said oligomer or monomer containing ethylenically unsaturated polyfunctional groups; and
   (d) from about 0 wt % to about 25 wt % of a chain transfer agent, wherein the combined weight amount of the components (a) and (c) is less than the combined weight amount of the components (b) and (d) and further wherein the ink composition (1) is substantially free of solvent, (2) is substantially free of acrylic polymers or co-polymers having an acid number below about 20, (3) has a viscosity at 25° C. of not greater than about 50cPs, and (4) when cured by radiation forms an ink having an elongation of at least about 150%.

19. The ink composition of claim 18, having a viscosity at 25° C. of not greater than about 30 cPs.

20. An article comprising a substrate and the cured ink composition of claim 1.

21. The radiation curable and jettable ink composition of claim 18 further consisting essentially of from about 0.01 wt. % to about 25 wt. % of a colorant.

22. The radiation curable and jettable ink composition of claim 1 further wherein the composition has a surface tension at 25° C. of less than about 40 dynes/cm.

* * * * *